US 7,095,543 B1

(12) United States Patent
Hill et al.

(10) Patent No.: US 7,095,543 B1
(45) Date of Patent: Aug. 22, 2006

(54) DUAL-ELECTRODE TRAVELING WAVE OPTICAL PHASE SHIFTERS AND METHODS

(75) Inventors: Marc E. Hill, Woodside, CA (US); Jonathan P. King, San Jose, CA (US); Hui Wu, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 1084 days.

(21) Appl. No.: 09/792,219

(22) Filed: Feb. 23, 2001

(51) Int. Cl.
G02F 1/035 (2006.01)

(52) U.S. Cl. .................... 359/254; 359/255; 385/3

(58) Field of Classification Search ........... 359/251, 359/252, 254, 255; 385/1–3
See application file for complete search history.

(56) References Cited

U.S. PATENT DOCUMENTS

| 4,691,984 | A | * | 9/1987 | Thaniyavarn | 385/8 |
| 4,932,737 | A | * | 6/1990 | Yoon et al. | 385/3 |
| 4,936,644 | A | * | 6/1990 | Raskin et al. | 385/2 |
| 5,007,696 | A | * | 4/1991 | Thackara et al. | 385/2 |
| 5,168,534 | A | | 12/1992 | McBrien et al. | 385/2 |
| 5,371,817 | A | * | 12/1994 | Revelli et al. | 384/44 |
| 5,502,780 | A | * | 3/1996 | Rangaraj | 385/3 |
| 5,508,845 | A | | 4/1996 | Frisken | 359/161 |
| 5,543,952 | A | | 8/1996 | Yonenaga et al. | 359/181 |
| 5,594,583 | A | | 1/1997 | Devaux | 359/184 |
| 5,880,870 | A | | 3/1999 | Sieben et al. | 359/181 |
| 6,021,232 | A | | 2/2000 | Madabhushi | 385/3 |
| 6,046,838 | A | | 4/2000 | Kou et al. | 359/245 |
| 2001/0046341 | A1 | * | 11/2001 | Nakabayashi | 385/14 |

OTHER PUBLICATIONS

Rod C. Alferness; Waveguide Electrooptic Modulators. IEEE Transactions on Microwave Theory and Techniques, vol. MTT-30, No. 8, Aug. 1982.
Gopalakrishnan, Ganesh K; William K Burns; Robert W. McElhanon; Catherine H. Bulmer, and Arthus S. Green Blatt Performance and Modeling of Broadband LiNbO$_3$ Traveling Wave Optical Intensity Modulators Journal of Lightwave Technology, vol. 12, No. 10, Oct. 1994.
Noguchi, Kazuto; Miyazawa, Hiroshi; and Mitomi, Osamu. 40-Gbit/s Ti: LiNbO$_3$ Optical Modulator with a Two-Stage Electrode, IEICE Trans. Electron; vol. E81-C, No. 8, Aug. 1998.

* cited by examiner

*Primary Examiner*—Jordan Schwartz
*Assistant Examiner*—William Choi

(57) ABSTRACT

The invention discloses phase-shifters, modulators, and method that produces a smaller π by means of a field excitation using multiple electrodes. A negative signal is introduced that travels with the positive signal, which enhances the electric field significantly. The field enhancement is provided by the superposition of the fields accumulated from each electrode. A base or substrate material can be made from any compound having linear electro-optic properties, such as lithium niobate, lithium tantalite, potassium lithium niobate, potassium titanyl phosphate or gallium-arsenide. For lithium niobate, there are two possible orientations of electric field, z-cut orientation or x-cut orientation.

12 Claims, 35 Drawing Sheets

30

Using horizontal field

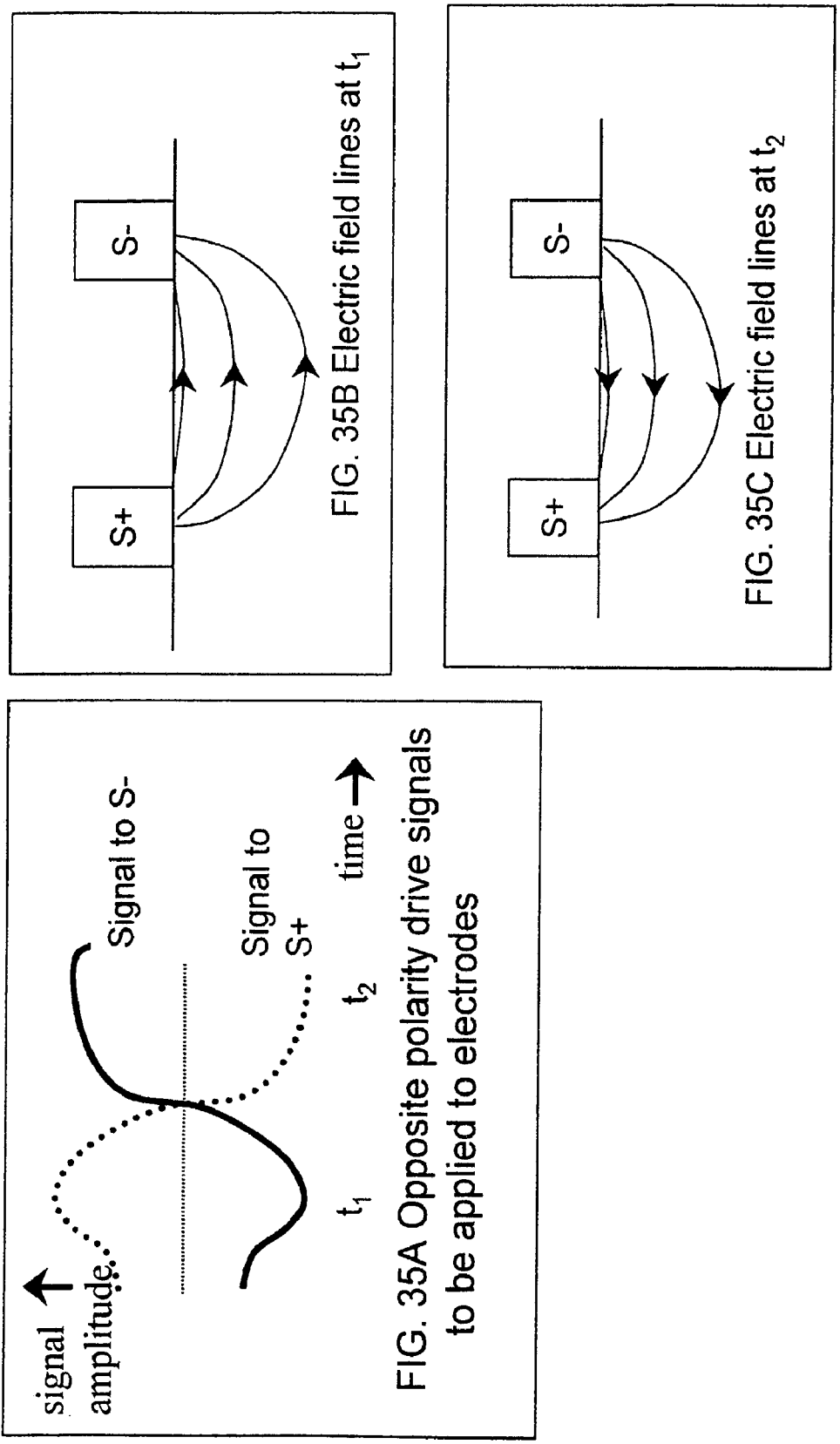

DUAL-ELECTRODE TRAVELING WAVE OPTICAL PHASE SHIFTERS AND METHODS

CROSS REFERENCE TO RELATED APPLICATIONS

This application relates to concurrently filed, co-pending application U.S. patent application Ser. No. 09/791,956, entitled "Tri-Electrode Traveling Wave Optical Phase Shifters and Methods" by Marc Hill et al., owned by the assignee of this application and incorporated herein by reference.

This application relates to concurrently filed, co-pending application U.S. patent application Ser. No. 09/792,220, entitled "Tri-Electrode Traveling Wave Optical Modulators and Methods" by Marc Hill et al., owned by the assignee of this application and incorporated herein by reference.

This application relates to concurrently filed, co-pending application U.S. patent application Ser. No. 09/792,222, entitled "Dual-Electrode Traveling Wave Optical Modulators and Methods" by Marc Hill et al., owned by the assignee of this application and incorporated herein by reference.

BACKGROUND INFORMATION

1. Field of the Invention

The present invention relates to the field of optical devices, and particularly to light modulators such as traveling-wave modulators, phase shifters, and switches.

2. Description of Related Art

Telecommunication companies seek to increase the amount of information throughput with fatter pipes and at higher speed to meet the demand from the industrial, business, and consumer markets. This in turn requires a light transmitting system to enlarge transmission and receiving capacity drastically. At present, the light transmission speed of 10 Gb/second has already been reduced to practice for commercial use, with the next hurdle set at 40 Gb/second.

Several testings are underway to find a suitable material for use as an optical waveguide in a traveling-wave light modulator that is capable of operating in broad band at high frequency, such material includes lithium niobate (LiNbO), lithium tantalite, potassium lithium niobate, potassium titanyl phosphate or gallium-arsenide. Lithium niobate and lithium tantalite are excellent ferroelectric materials, with large electro-optical coefficients, which can control a light phase proportional to an electrical field strength within an optical waveguide generated by an electrical signal applied to electrical electrodes.

Factors which effect the modulation of a traveling-wave light modulator include velocity mismatch, impedance mismatch, dispersion, electrode power loss, and the electrical field generation. Among them, velocity mismatch, impedance mismatch and dispersion are principally determined by the structure of the traveling-wave light modulator, which can be achieved with careful electrode design. However, the electrical field strength is determined by the applied electrical signal amplitude, the electrode power loss and the electrode structure, and the excitation mode in the electrode structure. For 40 Gb/sec. modulation, one of the major challenges is to reduce the required driving voltage of the modulator, which is generally dictated by high electrode loss and the difficulties of generating high-voltage swing with semiconductors at this speed.

In electrical field generation and the phase modulation, at the input of one electrical waveguide or electrode, a high-speed electrical signal is applied and triggers an electromagnetic wave propagating along the waveguide. The field strength at a certain point along the waveguide is determined by the particular way in which the EM wave was excited for a given input voltage, and the propagation attenuation along the waveguide. The optical index of the optical waveguide is changed linearly by the applied electrical field, and the overall phase change of the optical signal is an integration of all the incremental phase changes along the waveguide and is proportional to the product of the driving voltage and the modulation length. Due to bandwidth considerations, the effective modulation length cannot be increased beyond a limit and hence a driving voltage above a threshold is required to achieve a required optical modulation. For high-speed communications systems transmitting at 10 Gb/sec or higher, the electrode loss is significant and typically leads to a very high required driving voltage.

Given the high loss and the limited voltage swing, it adds more complexity and cost to realize a practical communication system using such a modulator, if not impossible. The under-driven modulator would lead to significant degradation of the modulated light signal and significantly limits its use to many communication systems. Therefore, a light modulator having a lower driving voltage is in demand.

Attempts have been made to reduce a driving voltage. One method has been a two stage electrode design which uses the first stage of the electrode to primarily achieve the maximum overlap of the electrical field and the optical field, and uses the second stage to achieve the phase velocity match the between the electrical and the optical signals. However, it is difficult to realize due to phase matching required of the two stages of the electrode. Further, it just introduces one more freedom to alleviate the constraints for simultaneous phase and field matching. It does not provide an effective means to reduce the driving voltage.

A ridge structure is a modification of a conventional CPW (co-planar waveguide) design, by raising the center electrode conductor above the two grounding planes. It does provide the advantage of lowering the driving voltage. For example, see K. Noguchi et al, "Highly efficient 40-GHz bandwidth Ti: LiNbO optical modulator employing ridge structure", IEEE Photonics Technology Letters, Vol. 5, No. 1, January 1993. However, it is difficult to realize due to the additional processes and the additional optical signal losses incurred by fabricating the ridge. Moreover, the reduction of the driving voltage is very limited, which is about 20% typically.

A conventional broadband optical communication uses a Mach-Zehnder interferometer to modulate laser signals in a transmitter. An electric field applied to an optical waveguide changes its index of refraction. A signal strip and ground plane (a zero voltage), form an electrical waveguide (EWG), where the induced electric field creates a change in the refractive index of the inlayed optical waveguide (OWG). The index of the material, for example, LiNbO3 or GaAs, depends on the amplitude and direction of the applied electric field.

Lithium-Niobate Mach-Zehnder modulators require a large voltage and length to provide a $\pi$ phase shift through an active length L. The voltage level required is too large relative to amount provided by ultra-fast electronic transistors. The length of the modulator is limited by the synchronism of the electric and optical propagating waves. For this reason, the length cannot be increased without a regenerative amplification of the signal or a multistage system that requires precise synchronization.

Accordingly, it is desirable to have phase shifters, modulators, and methods that decrease a $V_\pi$ value or shortening of an active length.

SUMMARY OF THE INVENTION

The invention discloses phase-shifters, modulators, and methods that produce a smaller $V\pi$ by means of a field excitation using multiple electrodes. A negative signal is introduced that travels with the positive signal, which enhances the electric field significantly. The field enhancement is provided by the superposition of the fields accumulated from each electrode. A base or substrate material can be made from any compound having linear electro-optic properties, such as lithium niobate, lithium tantalite, potassium lithium niobate, potassium titanyl phosphate or gallium-arsenide. For lithium niobate, there are two possible orientations of the crystal, z-cut or x-cut orientation. Horizontal electrical field is typically used to drive the x-cut crystal, and vertical electrical field is typically used to drive the z-cut crystal.

In a first aspect of the invention, tri-electrode traveling wave optical phase shifters and methods are disclosed. The optical shifters employing a tri-electrode configuration that are driven differentially and allows for a lower voltage to accumulate a phase shift. This type of shifter can be used in a Mach-Zehnder interferometer or a fast optical switch. Phase shifting an optical signal is desired in optical communications, i.e. in modulators or switches.

In a second aspect of the invention, tri-electrode traveling wave optical modulators and methods are disclosed. The optical modulators employing a tri-electrode configuration that are driven differentially and allow for a lower voltage to modulating an optical signal.

In a third aspect of the invention, dual-electrode traveling wave optical phase shifters and methods are disclosed. The optical shifters employing a differentially-driven dual-electrode that allows for a lower voltage to accumulate a phase shift.

In a fourth aspect of the invention, dual-electrode traveling wave optical modulators and methods are disclosed. The optical modulators employing differential strip fields with a dual-electrode that allow for a lower voltage to modulating an optical signal. One of ordinary skill in the art should know that the term differentially driven could mean the application of driving signals that have opposite polarity from one electrode to another electrode, or other similar definitions.

Optionally, a buffer layer is inserted between electrodes and a substrate to improve phase matching between an electrical signal and an optical signal. Advantageously, the present invention employing tri-electrodes or dual-electrodes allow for a better match of phase velocity and allow for a reduced buffer layer thickness that may be used between the optical and electrical waveguide.

Other structures and methods are disclosed in the detailed description below. This summary does not purport to define the invention. The invention is defined by the claims.

BRIEF DESCRIPTION OF THE DRAWINGS

FIG. 35A is a graphical diagram illustrating one example of a pair of time-varying signals having opposite polarity.

FIG. 35B is a graphical diagram illustrating electric field lines at time $t_1$. FIG. 35C is a graphical diagram illustrating electric field lines at time $t_2$.

DETAILED DESCRIPTION OF PREFERRED EMBODIMENTS

Figure 1:
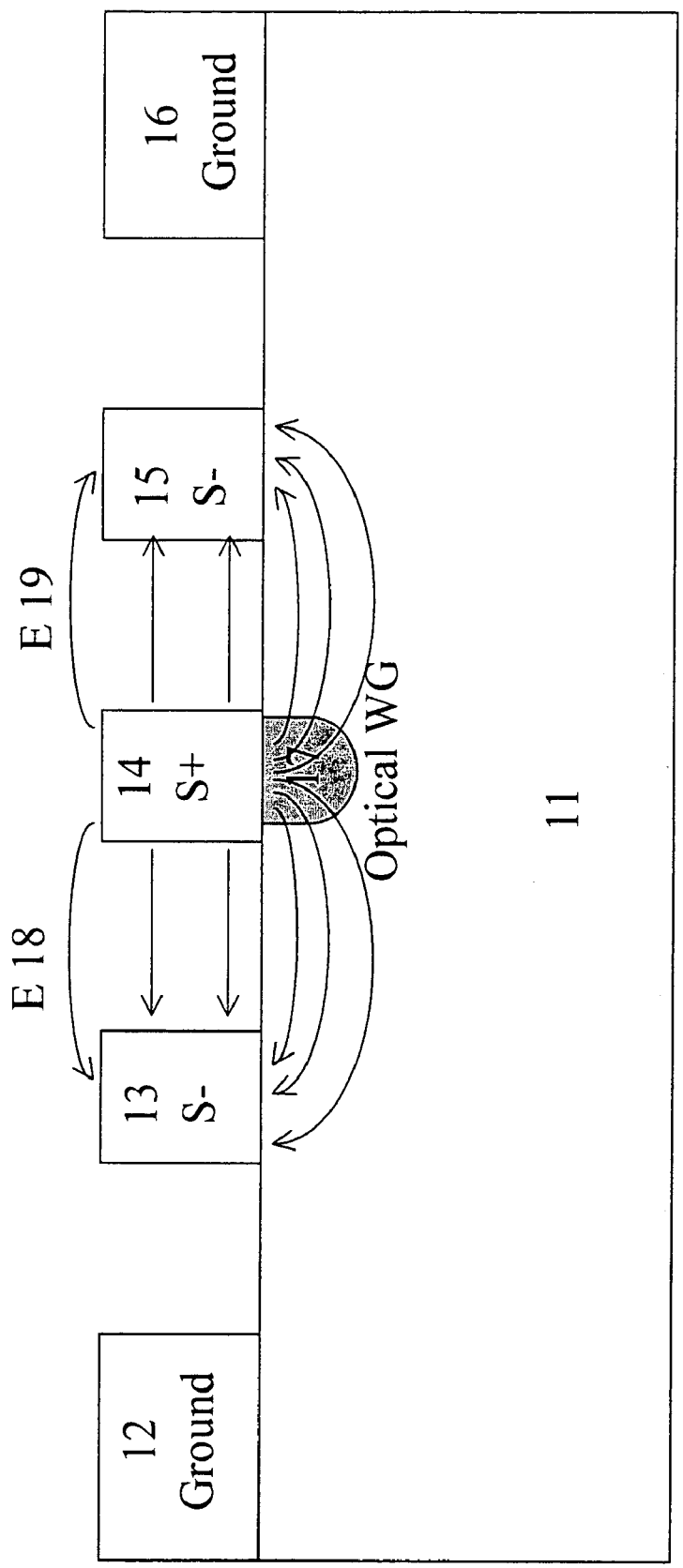
FIG. 1 is structural diagram illustrating a cross-sectional view of a tri-electrode phase-shifter with a vertical electric field in the optical waveguide in accordance with the present invention.

FIG. 1 is structural diagram illustrating a cross-sectional view of a tri-electrode phase-shifter 10 with a vertical electric field in a z-cut orientation. A basic structure of the tri-electrode phase-shifter 10 has three electrodes, a negative electrode S– 13, a positive electrode S+ 14, and a negative electrode S– 15, in which signals are applied on and trigger a traveling wave whose phase velocity matches that of an optical waveguide (WG) 17. The traveling electrical signal induces a change in the refractive index in the optical waveguide 17 and hence induces a phase change. The optical waveguide (WG) 17, which has a slightly higher refractive index than the surrounding material, is positioned underneath the base of the positive electrode S+ 14, thereby creating a vertical electric field in the optical waveguide 17. The optical waveguide 17, for example, is achieved by doping Ti in LiNbO3. An electrical field E 18 exists between the positive electrode S+ 14 and the negative electrode S– 13, and an electric field E 19 exists between the positive electrode S+ 14 and the negative electrode S– 15. The ground electrodes 12 and 16 are used to suppress the couplings to parasitic modes at high frequencies. A substrate 11 can be selected from a material such as like GaAs, KDP, or LiNbO3, which demonstrates a linear electro-optic effect.

Preferably, the optical waveguide (WG) 17 is placed in a center position underneath the positive electrode S+ 14. However, one of ordinary skill in the art should recognize that the optical waveguide (WG) 17 can be shifted to the left or the right of the positive electrode S+ 14, or align to the left edge or the right edge of the positive electrode S+ 14. The optical waveguide 17 can be doped or diffused with a material that has a slightly higher refractive index than the surrounding material. For example, Ti can be diffused into the material LiNbO3 to cause a higher index of refraction that guides a wave.

A negative signal is introduced from the electrode S– 13 that travels with the positive signal S+ 14 to enhance an electrical field significantly. The field enhancement is provided by the superposition of the fields created by each electrode giving better performance. The material 11 can be made of any compound having linear electro-optic properties. Lithium Niobate has a preferred direction, depending on the direction of a crystal. For the case of Lithium Niobate, there are two possible orientations of the electric field, z-cut or x-cut. Lithium Niobate is an anisotropic material, in which the z-axis possesses the highest electro-optical coefficient. FIG. 1 is intended as one illustration of the tri-electrode phase shifter 10 with the optical waveguide, for example, in z-cut orientation crystal. It is apparent to one of skill in the art that various types of optically active material, such as gallium-arsenide or lithium niobate x-cut, can be practiced without departing from the spirits of the present invention.

Figure 2:
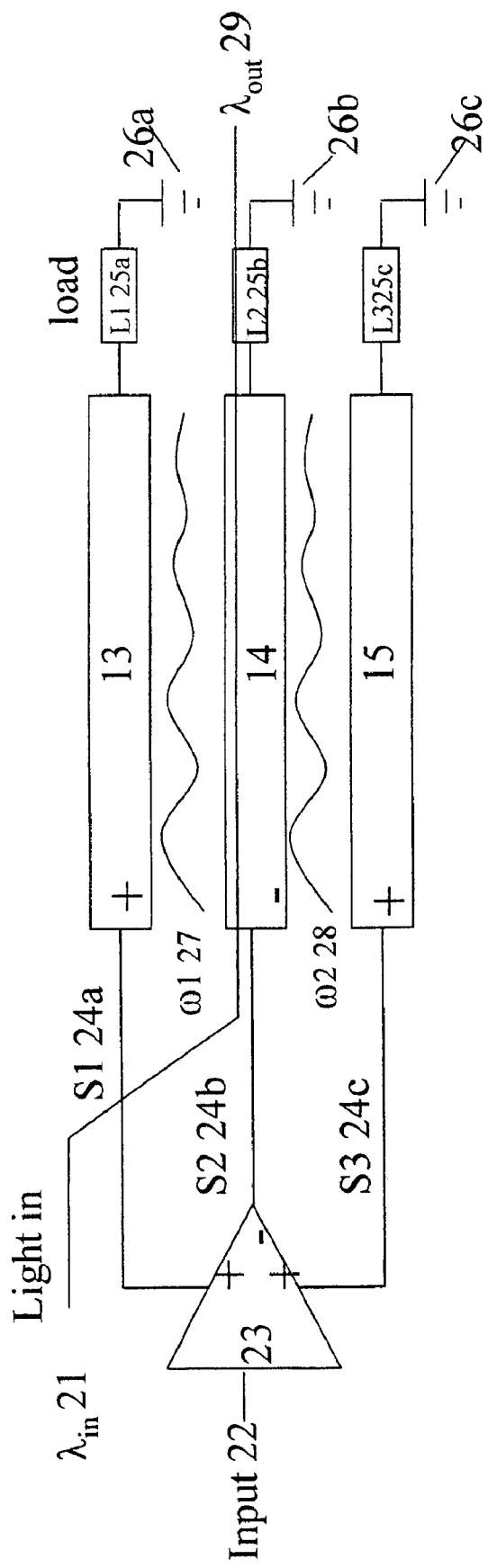
FIG. 2 is a circuit diagram illustrating a tri-electrode phase-shifter with a vertical field in the optical waveguide in accordance with the present invention.

FIG. 2 is a circuit diagram illustrating a tri-electrode phase-shifter 20 with a vertical electric field. An amplifier 23 receives an input 22 and generates three electrical outputs through a transmission line S1 24a, a transmission line S2 24b, and a transmission line S3 24c. The transmission line S1 24a extends through the electrode 13 to a load L1 or termination resistor 25a and a ground 26a. The transmission line S2 extends through the electrode 14 to a load L2 or termination resistor 25b and a ground 26b. The transmission line S3 24c extends through the electrode 15 to a load L3 or termination resistor 25c and a ground 26c. Between the negative electrode 13 and the positive electrode 14, a traveling electrical wave ω1 27 is created due to the proximity of the S1 24a transmission line and the S2 24b transmission line 24b. Between the positive electrode 14 and the negative electrode 15, a traveling electrical wave ω2 28 is created from the proximity of the S2 24b transmission line and the S3 24c transmission line. In this embodiment, an optical wave λin 21 received from, for example, an optical fiber (not shown), travels underneath the electrode S+ 14, generating an output λout 29. The optical signal λin 21 travels co-spatially with the electrical signal ω1 27 and ω2 28. Preferably, the traveling wave ω1 27 is identical or substantially similar to the traveling electrical wave ω2 28. Furthermore, the optical signal λin 21 travels with the same or substantially the same velocity as the traveling wave ω1 27 and ω2 28.

The amplifier 23 matches the impedance of the transmission lines S1 24a, S2 24b, and S3 24c, and matches with the impedance of the loads L1 25a, L2 25b, and L3 25c. In the preferred mode, the amplitudes of the negative electrodes S– 13 and S– 15 have the same amount of negative amplitude as the amplitude of the positive electrode S+ 14. The amount of signal amplitude applied affects the amount of phase shift. The amount of phase shift is linearly proportional to the signal amplitude generated from the amplifier 23. For example, if applying 1-volt, a 45° phase shift may result, and if applying 2-volts, a 90° phase shift may result.

A reduction of VπxL is caused by the superposition of the field induced by the electrodes, resulting in the enhancement in the electrical field. In one embodiment, the traveling electrical wave ω1 27 modulation is doubled due to the field excitation between the electrodes 13 and 14. However, the modulation can be more than 2 times, or less than 2x, depending on the distance between the electrodes 13 and 14, the height of each electrode 13 or 14, and the thickness of a buffer layer. Preferably, the ω1 27 modulation is symmetrical to the traveling electrical wave ω1 28 modulation. One of ordinary skill in the art, however, should recognize that the traveling electrical wave ω1 27 modulation and the traveling electrical wave ω1 28 modulation can be designed to be asymmetrical.

Optionally, a direct current (DC) bias field can be applied to each of the electrodes S– 13, S+ 14, and S– 15, by direct or indirect coupling.

Figure 3:
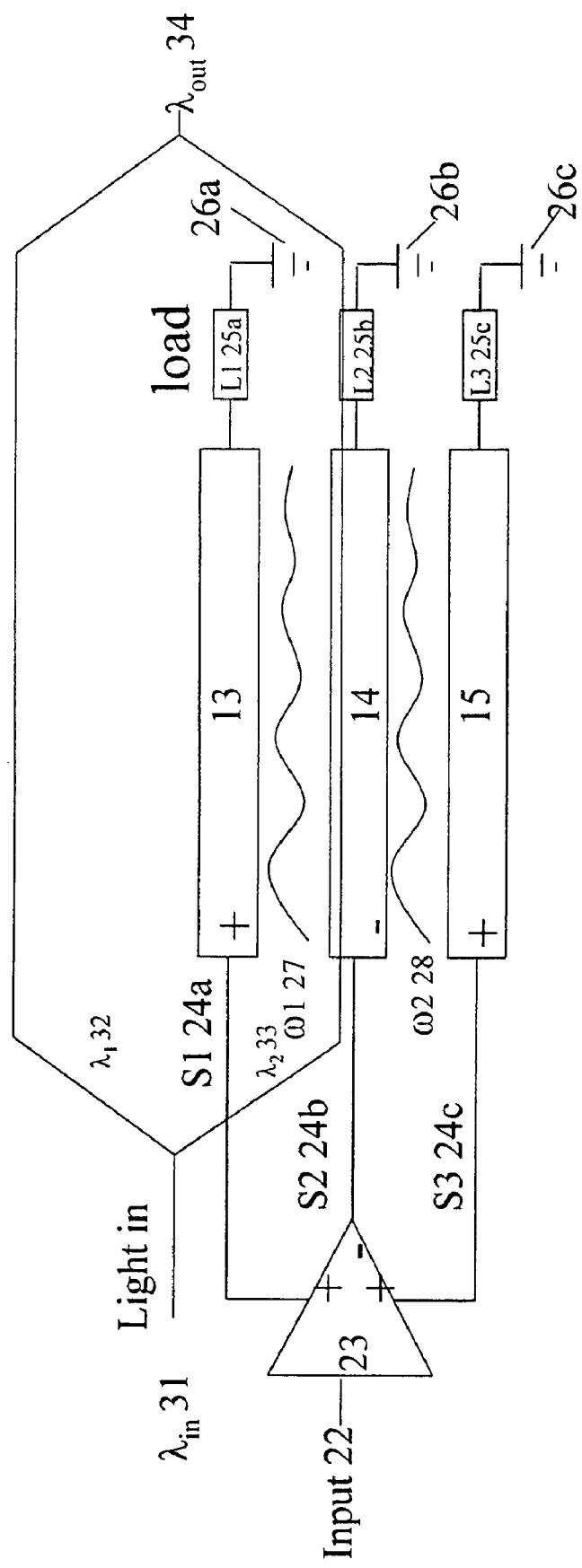
FIG. 3 is a circuit diagram illustrating a single arm modulator with a tri-electrode phase-shifter with a vertical electric field in the optical waveguide in accordance with the present invention.

FIG. 3 is a circuit diagram illustrating a single arm modulator 30 with a tri-electrode phase-shifter with a vertical electric field. The single arm or single arm modulator 30 receives a light signal input λin 31 and split the light signal $\lambda_{in}$ 31 into two optical paths, a $\lambda_1$ 32 and a $\lambda_2$ 33. The $\lambda_1$ 32 travels in an optical waveguide (not shown) that is routed away from the electrode S– 13, S+ 14, and S– 15. The $\lambda_2$ 33 travels underneath the electrode S+ 14. The $\lambda_1$ 32 and $\lambda_2$ 33 are combined to generate a single optical output $\lambda_{out}$ 34. The amplifier 23 receives the input 22 and generates three electrical outputs through the transmission line S1 24a, the transmission line S2 24b, and the transmission line S3 24c. The transmission line S1 24a extends through the electrode 13 to the load L1 or termination resistor 25a and the ground 26a. The transmission line S2 extends through the electrode 14 to the load L2 or termination resistor 25b and the ground 26b. The transmission line S3 24c extends through the electrode 15 to the load L3 or termination resistor 25c and the ground 26c. Between the negative electrode 13 and the positive electrode 14, a traveling electrical wave ω1 27 is created due to the close proximity of a gap between them. Between the positive electrode 14 and the negative electrode 15, the traveling electrical wave ω2 28 is created due to the close proximity of the gap between them. In this embodiment, an optical wave λin 31 received from, for example, an optical fiber travels through the electrode S+ 14, in generating an output rout 34. The optical signal λin 31 travels beneath traveling the electrical signal ω1 27. Preferably, the traveling wave ω1 27 is identical or substantially similar to the traveling electrical wave ω2 28.

Figure 4:
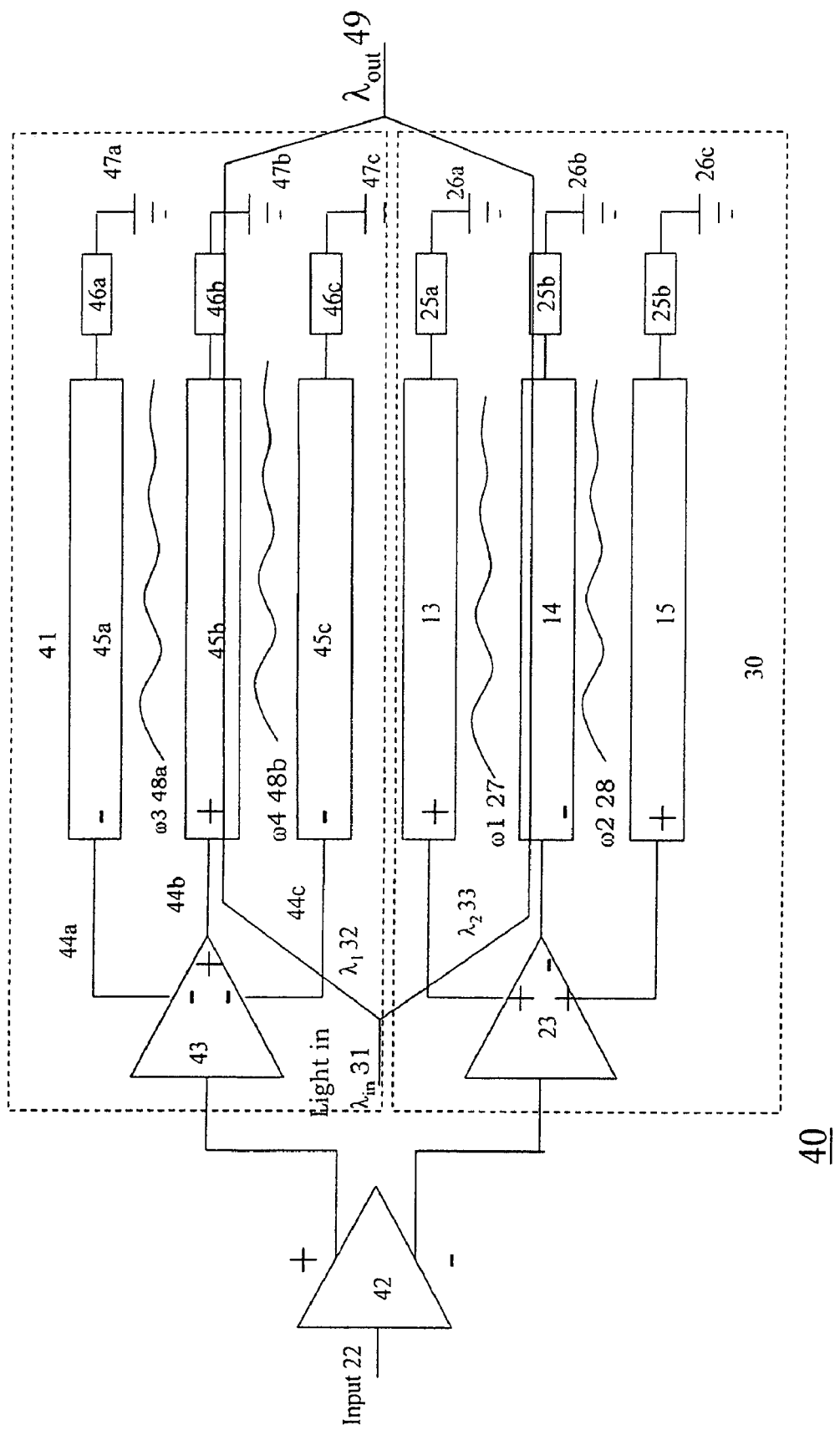
FIG. 4 is a circuit diagram illustrating one embodiment of two optical phase-shifters to form an optical switch, a Mach-Zehnder type interferometer or modulator in accordance with the present invention.

FIG. 4 is a circuit diagram illustrating one embodiment of two optical phase-shifters to form an optical switch, a Mach-Zehnder type interferometer or modulator 40, having an upper phase-shifter 41 and a lower optical phase-shifter 30. The light signal input λin 31 is split into two paths, the $\lambda_1$ 32 and the $\lambda_2$ 33, which are re-combined to generate a the $\lambda_{out}$ 49. An amplifier 42 receives the input 22 and generates a first output to an amplifier 43, and a second output to the amplifier 23. The amplifier 43 receives then generates three electrical outputs through a transmission line S1 44a, a transmission line S2 44b, and a transmission line S3 44c. The transmission line S1 44a extends through a first electrode 45a to the load L1 or termination resistor 46a and the ground 47a. The transmission line S2 44b extends through the electrode 45b to the load L2 or termination resistor 46b and the ground 47b. The transmission line S3 44c extends through the electrode 45c to the load L3 or termination resistor 46c and the ground 47c. Between the positive electrode 45b and the negative electrode 45a, a traveling electrical wave ω1 48a is created due to the close proximity of a gap between them. Between the negative electrode 45c and the positive electrode 45b, the traveling electrical wave ω2 48b is created due to the close proximity of the gap between them.

Preferably for wide band applications, the electrical wave ω1 27 matches or substantially matches the electrical wave ω2 28. Similarly, electrical wave ω3 48a matches or substantially matches the electrical wave ω4 48b. In addition, the light wave $\lambda_1$ 32 matches or substantially matches the light wave $\lambda_2$ 33. Optionally, the electrodes 13, 14, 15, 45a, 45b, and 45c can be connected to a voltage supply (not shown), to generate a DC bias field in the optical waveguide.

Advantageously, this embodiment with three electrodes in the present invention allow for a better match of phase velocity and allow for a reduced buffer layer thickness that may be used between the optical and electrical waveguide.

Figure 5:
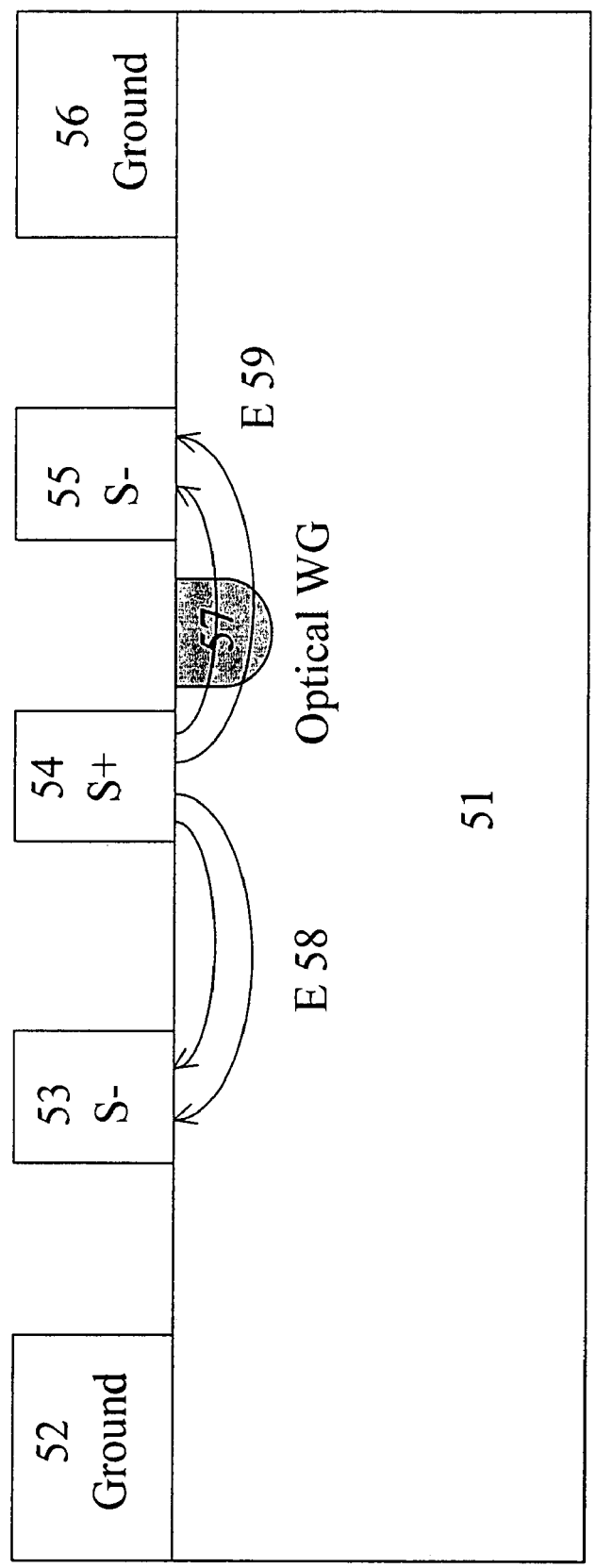
FIG. 5 is a structural diagram illustrating a cross-sectional view of a tri-electrode phase-shifter utilizing a horizontal electric field in the optical waveguide in accordance with the present invention.

FIG. 5 is a structural diagram illustrating a cross-sectional view of a tri-electrode phase-shifter 50 utilizing a horizontal electric field and with an x-cut orientation. The basic structure of the tri-electrode phase-shifter 50 has three electrodes, a negative electrode S– 53, a positive electrode S+ 54, and a negative electrode S– 55. An optical waveguide (WG) 57 is positioned in a gap underneath and in between the positive electrode S+ 54 and the positive electrode S– 55, thereby being placed in a substantially horizontal electric field 59 which exists between the positive electrode S+ 54 and the negative electrode S– 55.

Preferably, the optical waveguide (WG) 57 is placed in a center of and underneath a gap between the positive electrode S+ 54 and the negative electrode S– 55. However, one of ordinary skill in the art should recognize that the optical waveguide (WG) 57 can be shifted to toward the left and closer to the positive electrode S+ 54 or toward the right and closer to the negative electrode S– 55, or aligned to the right edge of the positive electrode S+ 54 or the left edge the negative electrode S– 55. The optical waveguide 57 can be doped or diffused with a material that has a slightly higher refractive index than the surrounding material. For example, if LiNbO, a Ti that is diffused into the material and that caused a higher index of refraction that guides a wave.

A negative signal is introduced into the electrode S− 53 that travels with the positive signal S+ 54 to provide significant enhancement of the electrical field. The field enhancement is provided by the superposition of the fields created by each electrode giving better performance. The material 51 can be made of any compound having linear electro-optic properties. Lithium Niobate has a preferred direction, depending on the direction of a crystal.

Figure 6:
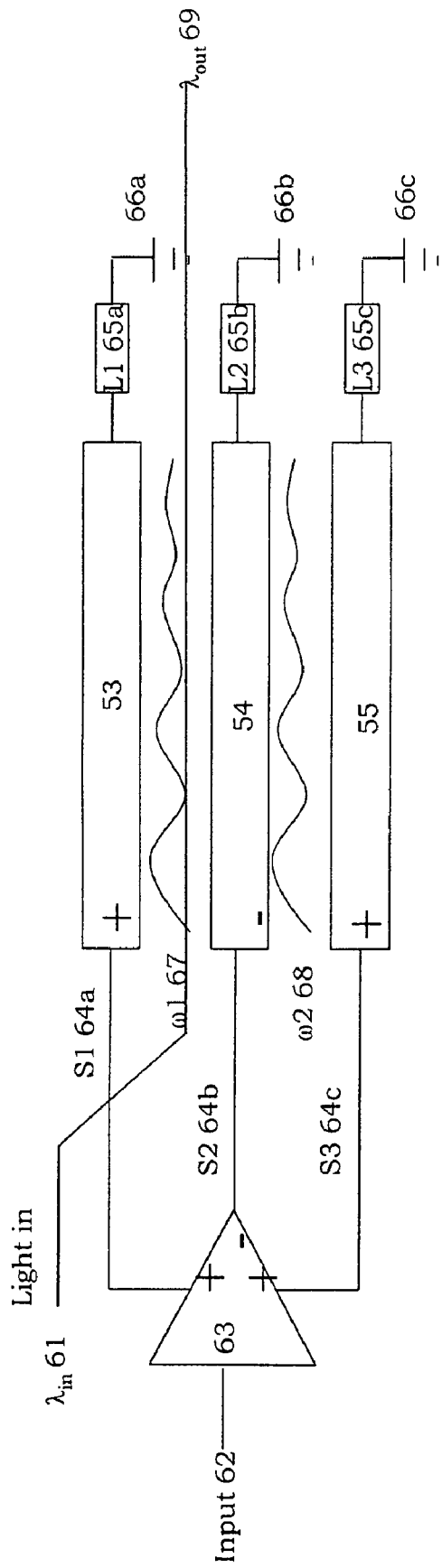
FIG. 6 is a circuit diagram illustrating a tri-electrode phase-shifter utilizing a horizontal field in the optical waveguide in accordance with the present invention.

FIG. 6 is a circuit diagram illustrating a tri-electrode phase-shifter 60 utilizing a horizontal electric field. An amplifier 63 receives an input 62 and generates three electrical outputs through a transmission line S1 64a, a transmission line S2 64b, and a transmission line S3 64c. The transmission line S1 64a extends through the electrode 53 to a load L1 or termination resistor 65a and a ground 66a. The transmission line S2 extends through the electrode 54 to a load L2 or termination resistor 65b and a ground 66b. The transmission line S3 64c extends through the electrode 55 to a load L3 or termination resistor 65c and a ground 66c. Between the negative electrode 53 and the positive electrode 54, a traveling electrical wave ω1 67 is created due to the proximity of the S1 64a transmission line and the S2 64b transmission line. Between the positive electrode 54 and the negative electrode 55, a traveling electrical wave ω2 68 is created due to their proximity. In this embodiment, an optical wave λin 61 received from, for example, an optical fiber, travels between the negative electrode S− 53 and the positive electrode S+ 54, in generating an output λout 69. The optical signal λin 61 travels co-spatially with the electrical signal ω1 67 and ω2 68. Preferably, the traveling wave ω1 67 is symmetrical or substantially symmetrical to the traveling electrical wave ω2 68.

The amplifier 63 matches the impedance of the transmission lines S1 64a, S2 64b and S3 64c, and matches the impedance of the loads L1 65a, L2 65b, and L3 65c. In the preferred mode, the amplitudes of the negative electrodes S− 53 and S− 55 have the same amount of amplitude as the amplitude of the positive electrode S+ 54.

The amount of signal amplitude applied affects the amount of phase shift. The amount of phase shift is linearly proportional to the signal amplitude generated from the amplifier 63. For example, if apply 1-volt, it may result in a 45 degree phase shift, and if apply 2-volt, it may result in a 90 degree phase shift.

Optionally, a direct current (DC) bias field can be applied to each of the electrodes S− 53, S+ 54, and S− 55, by direct or indirect coupling.

A reduction of VπxL is caused by the superposition of the field induced by the electrodes, resulting in the enhancement in the electrical field. In one embodiment, the amplitude of the traveling electrical wave ω1 67 is doubled due to the field excitation between the electrodes 53 and 54. However, the increase can be more than 2 times, or less than 2×, depending on the distance between the electrodes 53 and 54, the height and shape of each electrode 53 or 54, and the thickness of a buffer layer. Preferably, the ω1 67 modulation is symmetrical to the traveling electrical wave ω1 68 modulation. One of ordinary skill in the art, however, should recognize that the traveling electrical wave ω1 67 and the traveling electrical wave ω1 68 can be designed to by asymmetrical.

The electrodes of the optical phase-shifter would be driven as in FIG. 5, where a driver amplifier would provide the signal to the three electrodes, the outer two driven with the same polarity and the center with opposite polarity of the outer. The electrical signal propagates from left to right, where the signal is terminated into matched loads.

Figure 7:
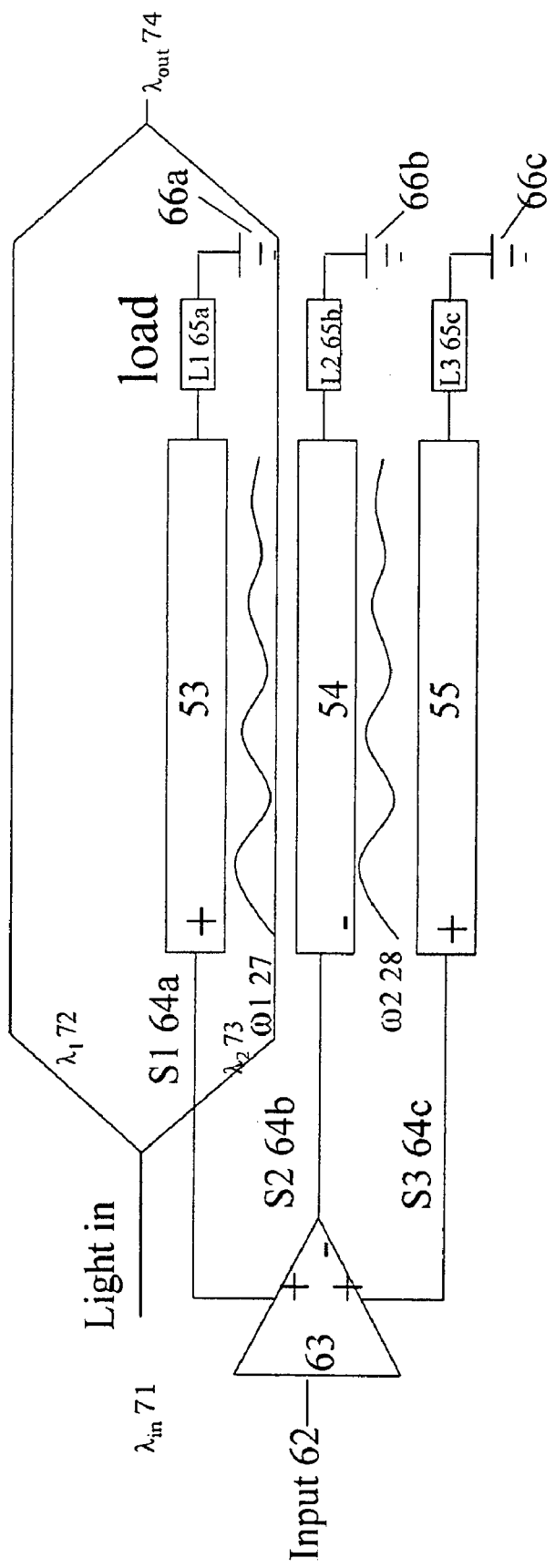
FIG. 7 is a circuit diagram illustrating a single arm modulator with a tri-electrode phase-shifter utilizing a horizontal electric field in the optical waveguide in accordance with the present invention.

FIG. 7 is a circuit diagram illustrating a single a modulator 70 with a tri-electrode phase-shifter utilizing a horizontal electric field. The light signal input λin 71 is split into two optical paths, a λ1 72 and a λ2 73. The λ1 72 travels in an optical waveguide (not shown) that is routed away from the electrodes S− 53, S+ 54 and S− 55, while the λ2 73 travels between the electrode S− 53 and the electrode S+ 54. λ1 72 and a λ2 73 are combined to generate a single optical output λout 741. The amplifier 63 receives the input 62 and generates three electrical outputs through the transmission line S1 64a, the transmission line S2 64b, and the transmission line S3 64c. The transmission line S1 64a extends through the electrode 53 to the load L1 or termination resistor 65a and a ground 66a. The transmission line S2 extends through the electrode 54 to the load L2 or termination resistor 65b and the ground 66b. The transmission line S3 64c extends through the electrode 55 to the load L3 or termination resistor 65c and the ground 66c. Between the negative electrode 53 and the positive electrode 54, a traveling electrical wave ω1 67 is created due to their proximity. Between the positive electrode 54 and the negative electrode 55, a traveling electrical wave ω2 68 is created due to their proximity. In this embodiment, an optical wave λin 71 received from, for example, an optical fiber (not shown), travels between the negative electrode S− 53 and the positive electrode S+ 54, in generating an output λout 69. The optical signal λin 61 travels co-spatially with the electrical signal ω1 67 and ω2 68. Preferably, the traveling wave ω1 67 is symmetrical or substantially symmetrical to the traveling electrical wave ω2 68.

Figure 8:
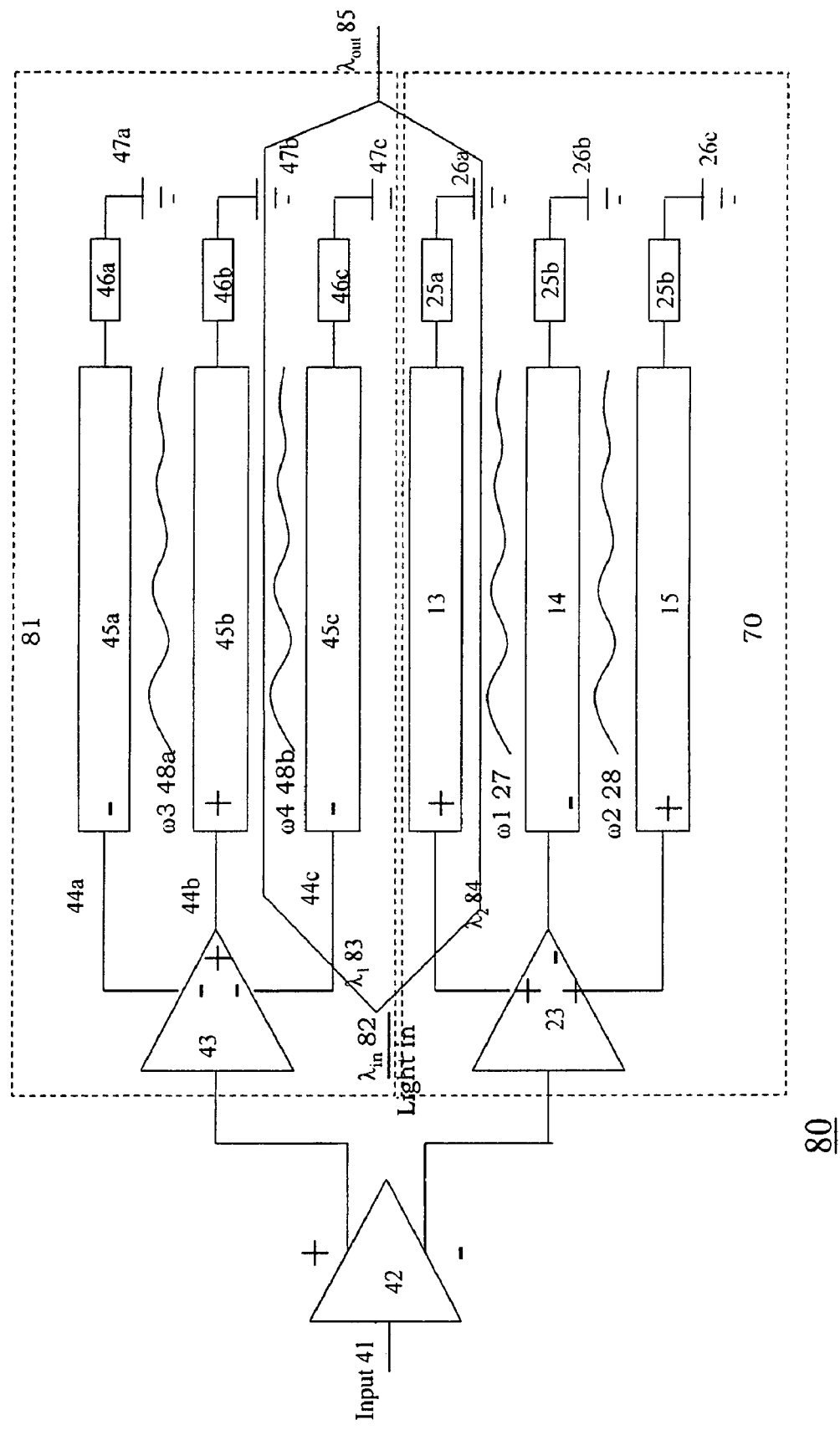
FIG. 8 is a circuit diagram illustrating a first embodiment of two optical phase shifters in constructing an optical switch, a modular, or a Mach-Zehnder type interferometer in accordance with the present invention.

FIG. 8 is a circuit diagram illustrating a first embodiment of two optical phase shifters 80 in constructing an optical switch, a modulator, or a Mach-Zehnder type interferometer. The two phase-shifters 80 has an upper phase shifter 81 and a lower optical phase shifter 70. The light signal input λin 82 is split into two paths, the $\lambda_1$ 83 and the $\lambda_2$ 84, which are re-combined to generate a the $\lambda_{out}$ 85. In this embodiment, the light signal $\lambda_1$ 82 travels between a positive electrode 45b and a negative electrode 45c, while the light signal $\lambda_2$ 83 travels between the positive electrode 13 and the negative electrode 14. The amplifier 42 receives the input 41 and generates a first output to an amplifier 43, and a second output to the amplifier 23. The amplifier 43 receives then generates three electrical outputs through a transmission line S1 44a, a transmission line S2 44b, and a transmission line S3 44c. The transmission line S1 44a extends through a first electrode 45a to the load L1 or termination resistor 46a and the ground 47a. The transmission line S2 44b extends through the electrode 45b to the load L2 or termination resistor 46b and the ground 47b. The transmission line S3 44c extends through the electrode 45c to the load L3 or termination resistor 46c and the ground 47c. Between the positive electrode 45b and the negative electrode 45a, a traveling electrical wave ω1 48a is created due to the close proximity of a gap between them. Between the negative electrode 45c and the positive electrode 45b, the traveling electrical wave ω2 48b is created due to the close proximity of the gap between them.

Figure 9:
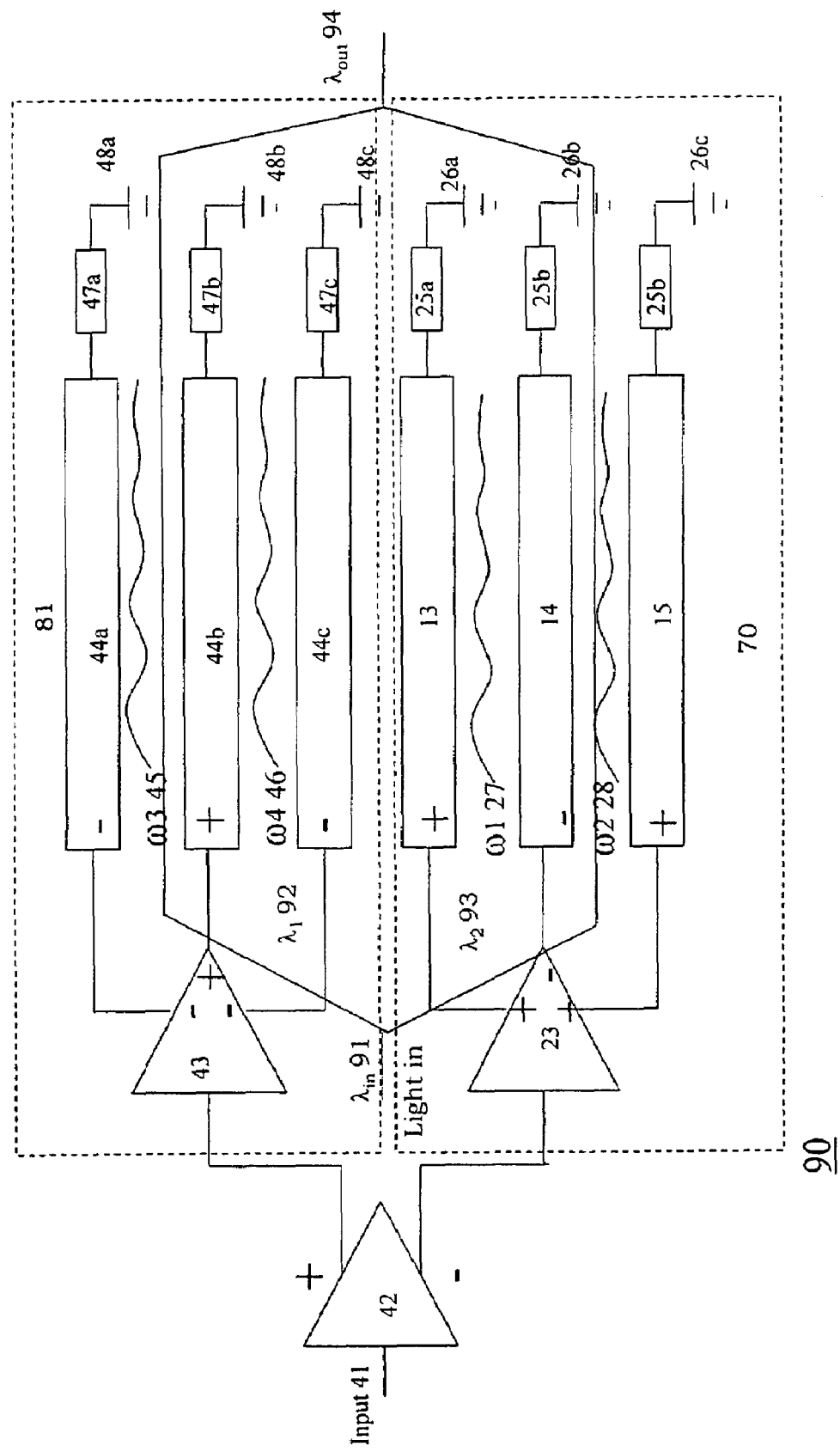
FIG. 9 is a circuit diagram illustrating a second embodiment of a two phase-shifters in constructing an optical switch, a modular, or a Mach-Zehnder type interferometer in accordance with the present invention.

FIG. 9 is a circuit diagram illustrating a second embodiment of a two phase-shifters in constructing an optical switch, a modulator, or a Mach-Zehnder type interferometer. The light signal input λin 91 is split into two paths, the $\lambda_1$ 92 and the $\lambda_2$ 93, which are re-combined to generate a the λ$_{out}$ 94. In this embodiment, the light signal λ$_1$ 82 travels between a negative electrode 45a and a positive electrode 45b, while the light signal λ$_2$ 83 travels between the negative electrode 14 and the positive electrode 15.

Figure 10:
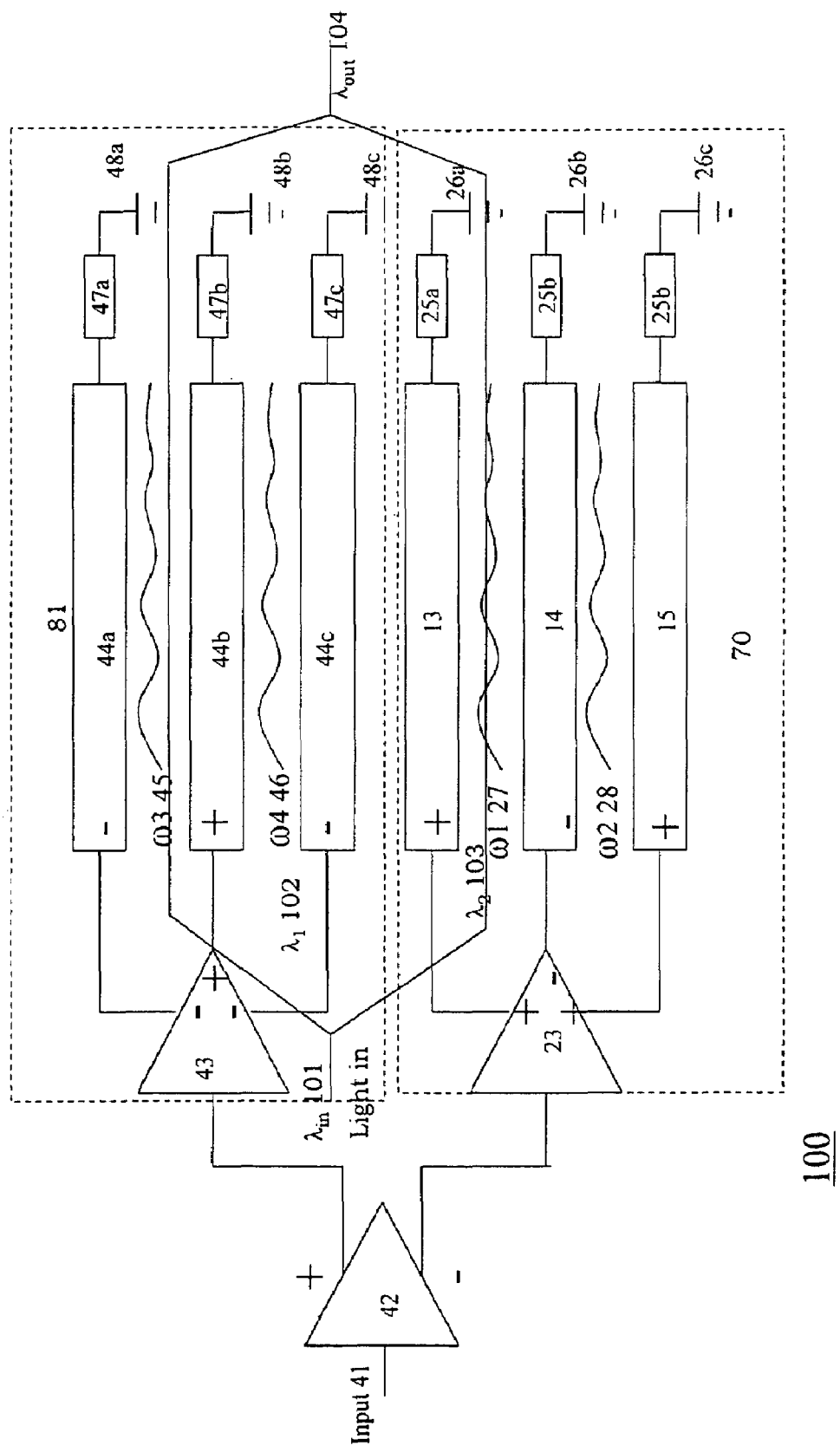
FIG. 10 is a circuit diagram illustrating a third embodiment of two optical phase shifters in constructing an optical switch, a modular, or a Mach-Zehnder type interferometer in accordance with the present invention.

FIG. 10 is a circuit diagram illustrating a third embodiment of two optical phase shifters 100 in constructing an optical switch, a modulator, or a Mach-Zehnder type interferometer. The light signal input λin 101 is split into two paths, the λ1 102 and the λ2 103, which are re-combined to generate a λout 104. In this embodiment, the light signal λ1 102 travels between the negative electrode 45a and the positive electrode 45b, while the light signal λ2 103 travels between the negative electrode 13 and the positive 15 electrode 14.

Figure 11:
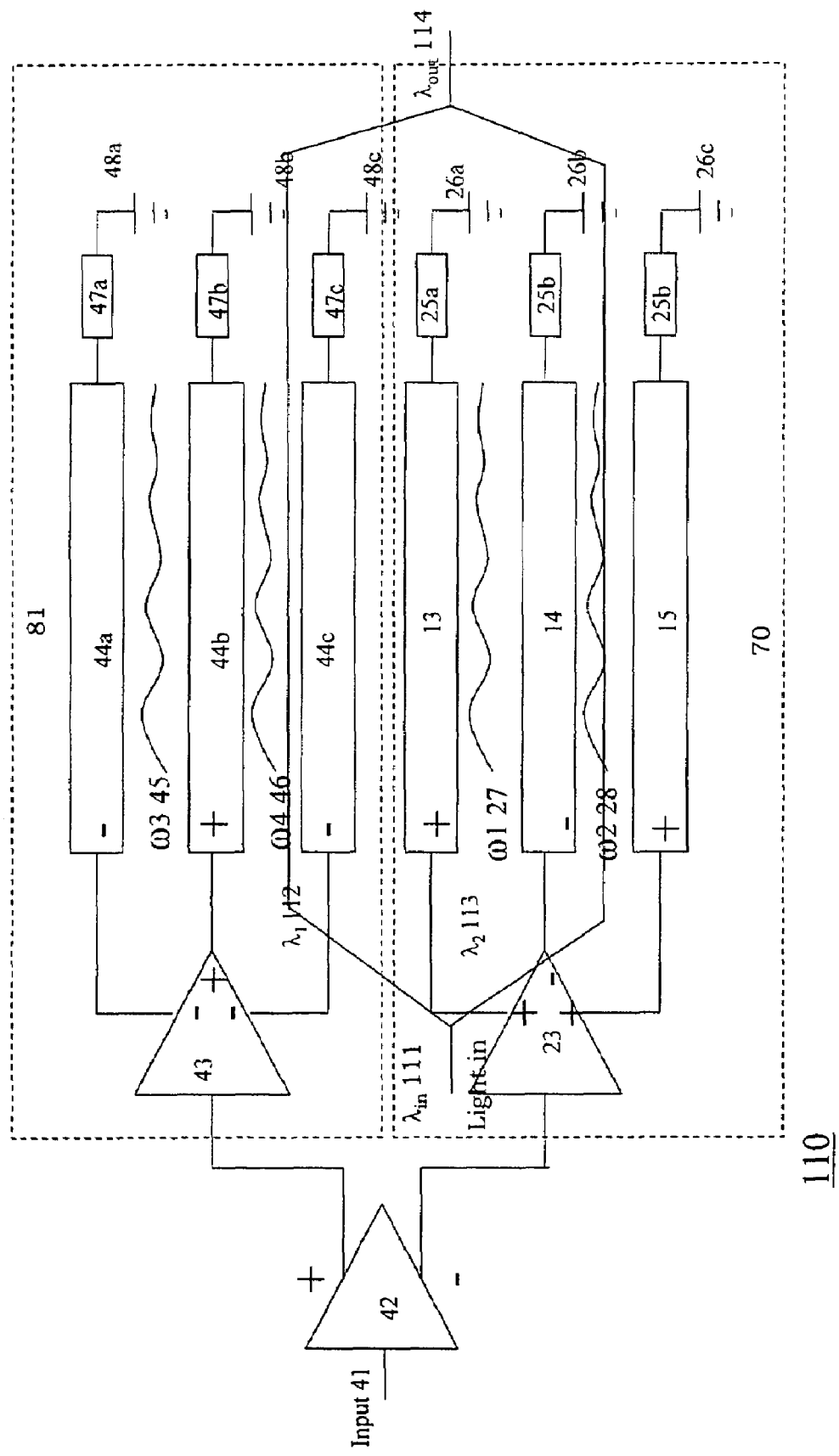
FIG. 11 is a circuit diagram illustrating a fourth embodiment of two optical phase-shifters in constructing an optical switch, a modular, or a Mach-Zehnder type interferometer in accordance with the present invention.

FIG. 11 is a circuit diagram illustrating a fourth embodiment of two optical phase-shifters 110 in constructing an optical switch, a modulator, or a Mach-Zehnder type interferometer. The light signal input λin 111 is split into two paths, the λ1 112 and the λ2 113, which are re-combined to generate a λout 114. In this embodiment, the light signal λ1 102 travels between the positive electrode 44b and the negative electrode 44c, while the light signal λ2 113 travels between the positive electrode 14 and the negative electrode 15.

Figure 12:
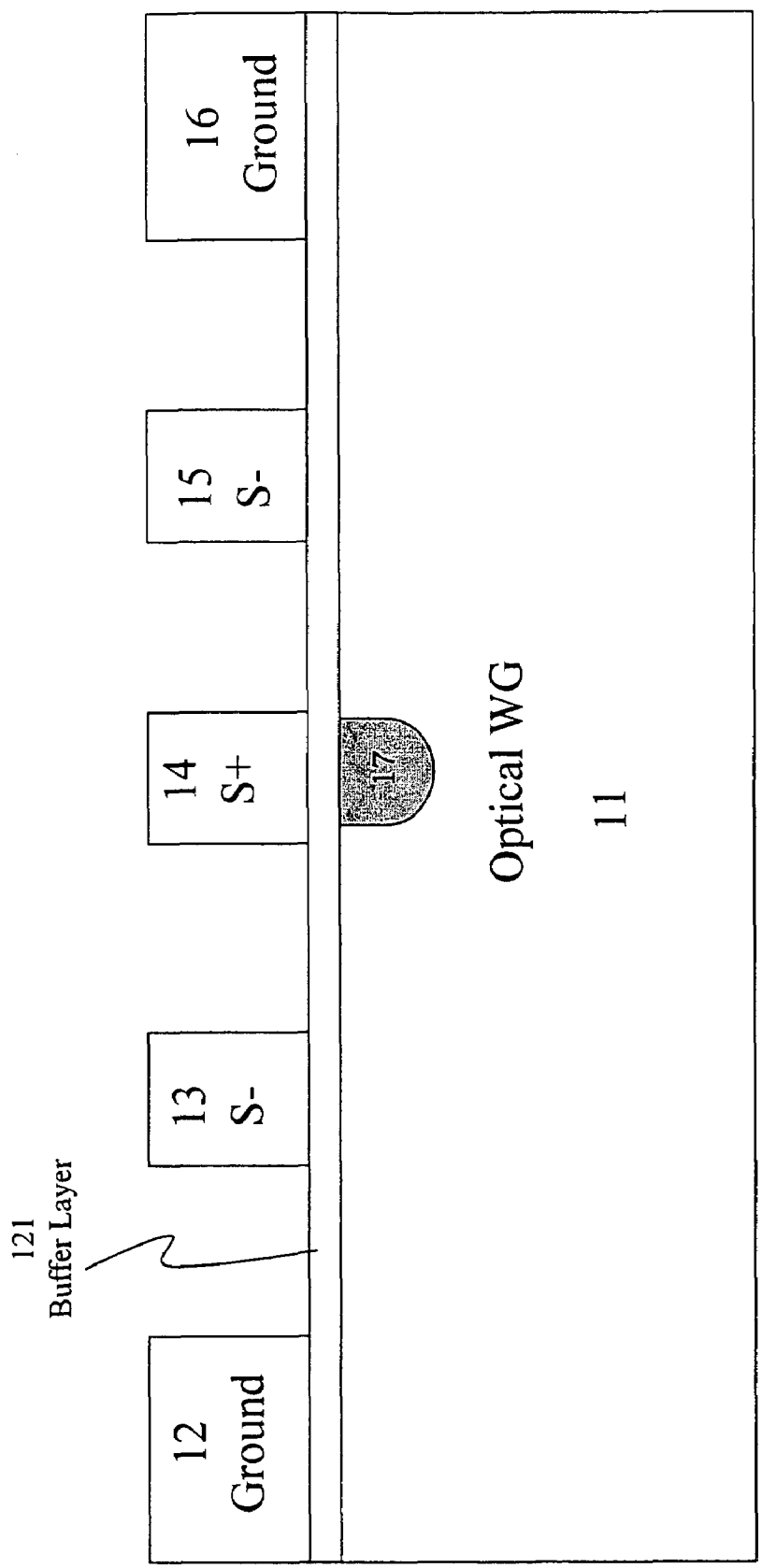
FIG. 12 is a structural diagram illustrating a first embodiment of a cross-sectional view of an optical phase-shifter employing a tri-electrode with a buffer layer utilizing a vertical electric field in the optical waveguide in accordance with the present invention.

FIG. 12 is a structural diagram illustrating a first embodiment of a cross-sectional view of an optical phase-shifter 120 with a buffer layer utilizing a vertical electric field in the optical waveguide. A buffer layer 121 is placed between the substrate 11, and the ground electrode 12, the negative S− electrode 13, the positive S+ electrode 14, the negative electrode S− 15, and the ground electrode 16. The width of the buffer layer 121 extends all the way from the ground electrode 12, through the negative S− electrode 13, the positive S+ electrode 14, the negative electrode S− 15, to the ground electrode 16. The buffer layer 121 preferably has a significantly lower dielectric constant than that of the substrate 11. The use of the buffer layer 121 helps to improve the phase matching between an electrical signal and an optical signal, as well as increasing the electrode impedance.

If the substrate 11 uses lithium niobate, the preferred material for the buffer layer 121 is silicon oxide, with a thickness of, for example, 1 microns. With the buffer layer 121, the design of a phase shifter is significantly simpler due to the more electric field in the air. Optionally, the thickness of the buffer layer 121 can be reduced to enhance the electrical field.

Figure 13:
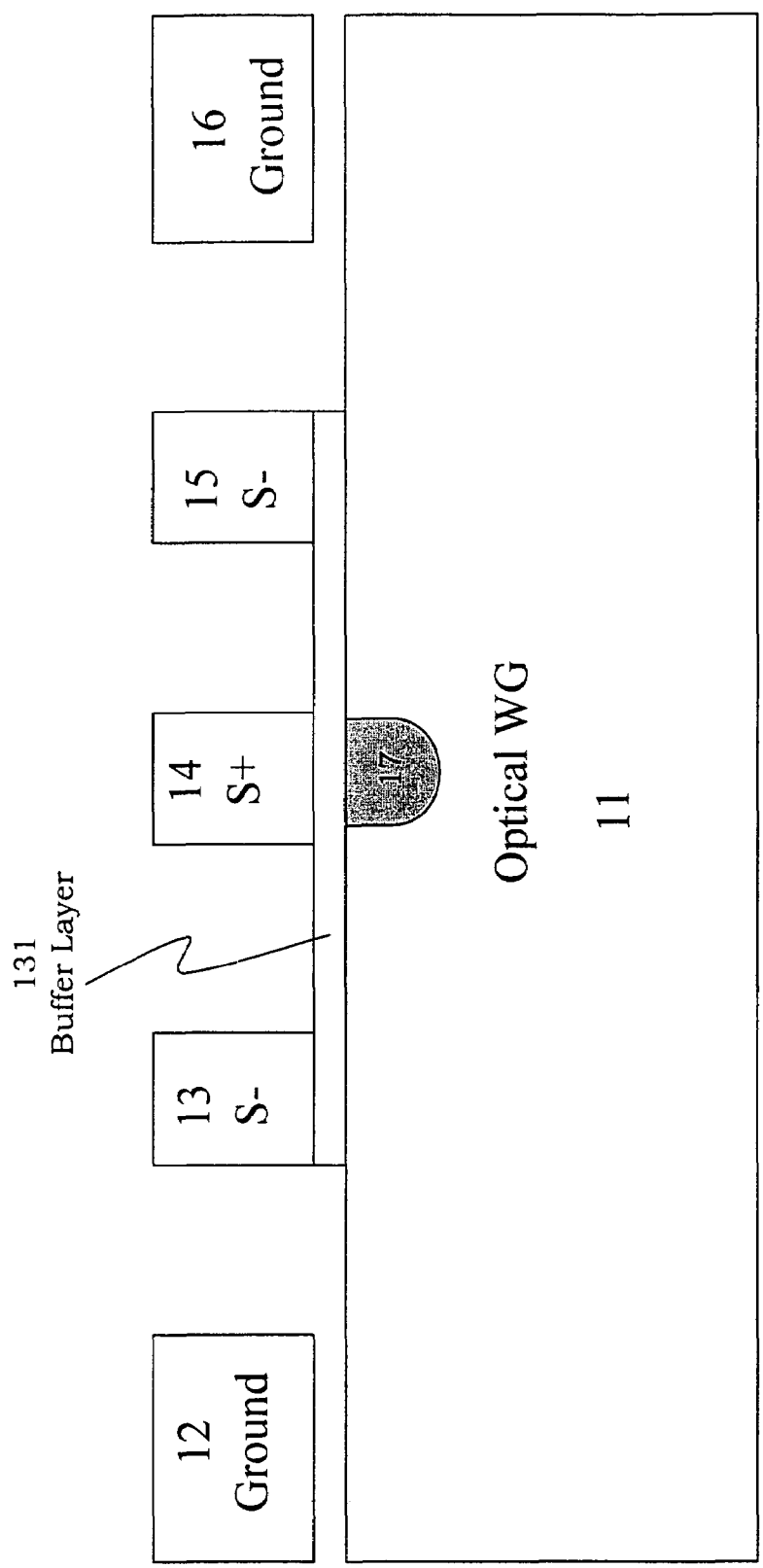
FIG. 13 is a structural diagram illustrating a second embodiment of a cross-sectional view of a tri-electrode optical shifter with a buffer layer utilizing a vertical electric field in the optical waveguide in accordance with the present invention.

FIG. 13 is a structural diagram illustrating a second embodiment of a cross-sectional view of a tri-electrode optical shifter 130 with a buffer layer utilizing a vertical electric field. The width of a buffer layer 131 extends underneath the negative S− electrode 13, the positive S+ electrode 14, and the negative electrode S− 15. The buffer layer 131 does not extend to underneath of the ground electrode 12 and the ground electrode 16. The buffer layer 131 preferably has a significantly lower dielectric constant than that of the substrate 11.

Figure 14:
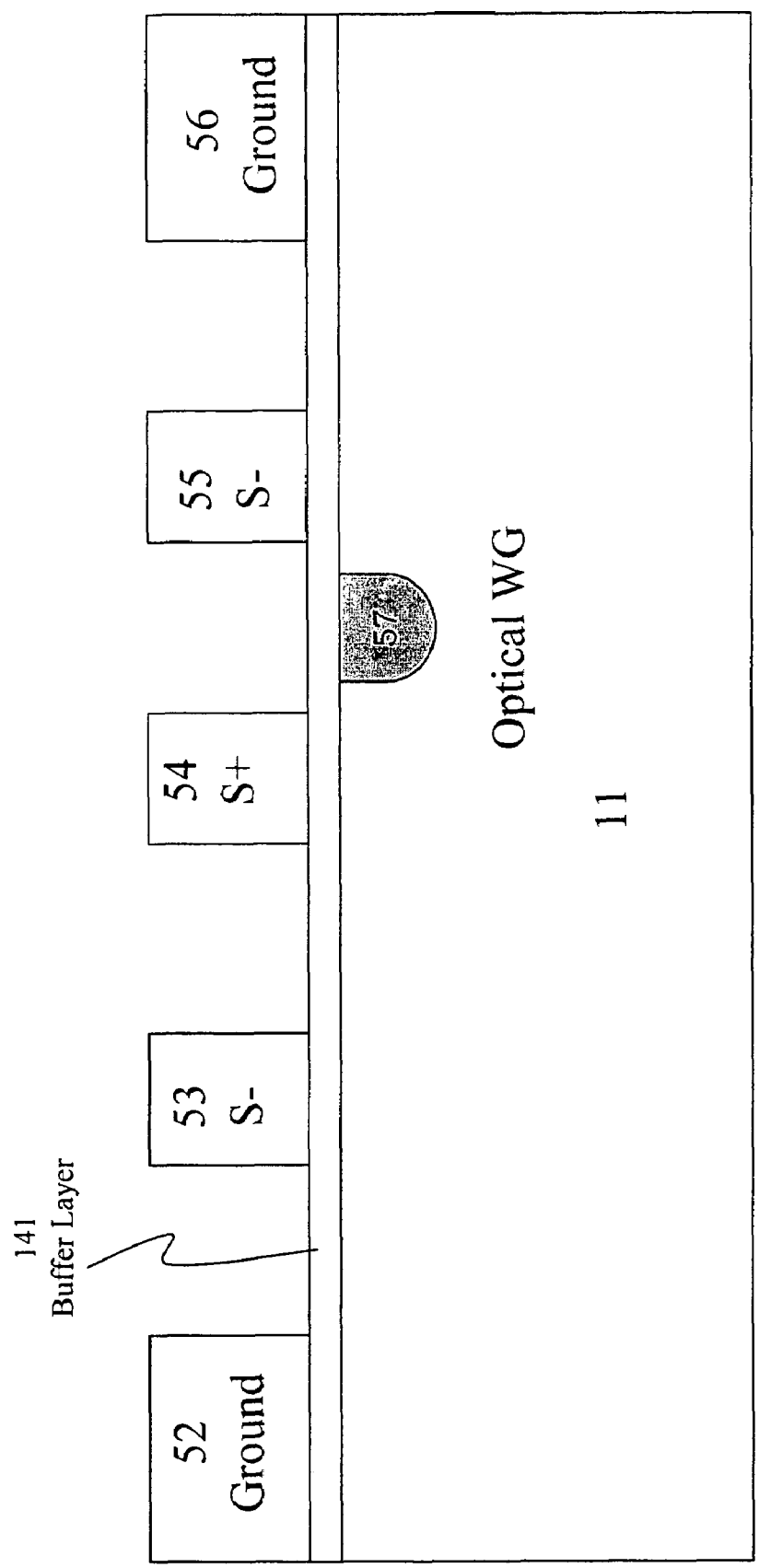
FIG. 14 is a structural diagram illustrating a third embodiment of a cross-sectional view of an optical phase-shifter employing a tri-electrode with a buffer layer utilizing a horizontal field in the optical waveguide in accordance with the present invention.

FIG. 14 is a structural diagram illustrating a third embodiment of a cross-sectional view of an optical phase-shifter with a buffer layer utilizing a horizontal field in the optical waveguide. A buffer layer 141 is placed between the substrate 51, and the ground electrode 52, the negative S-electrode 53, the positive S+ electrode 54, the negative electrode S− 55, and the ground electrode 56. The width of the buffer layer 141 extends all the way from the ground electrode 52, through the negative S− electrode 53, the positive S+ electrode 54, the negative electrode S− 55, to the ground electrode 56. The buffer layer 141 preferably has a significantly lower dielectric constant than that of the substrate 51. The optical waveguide 57 is positioned in a gap underneath and in between the positive S+ electrode 54 and the negative electrode S− 55.

Figure 15:
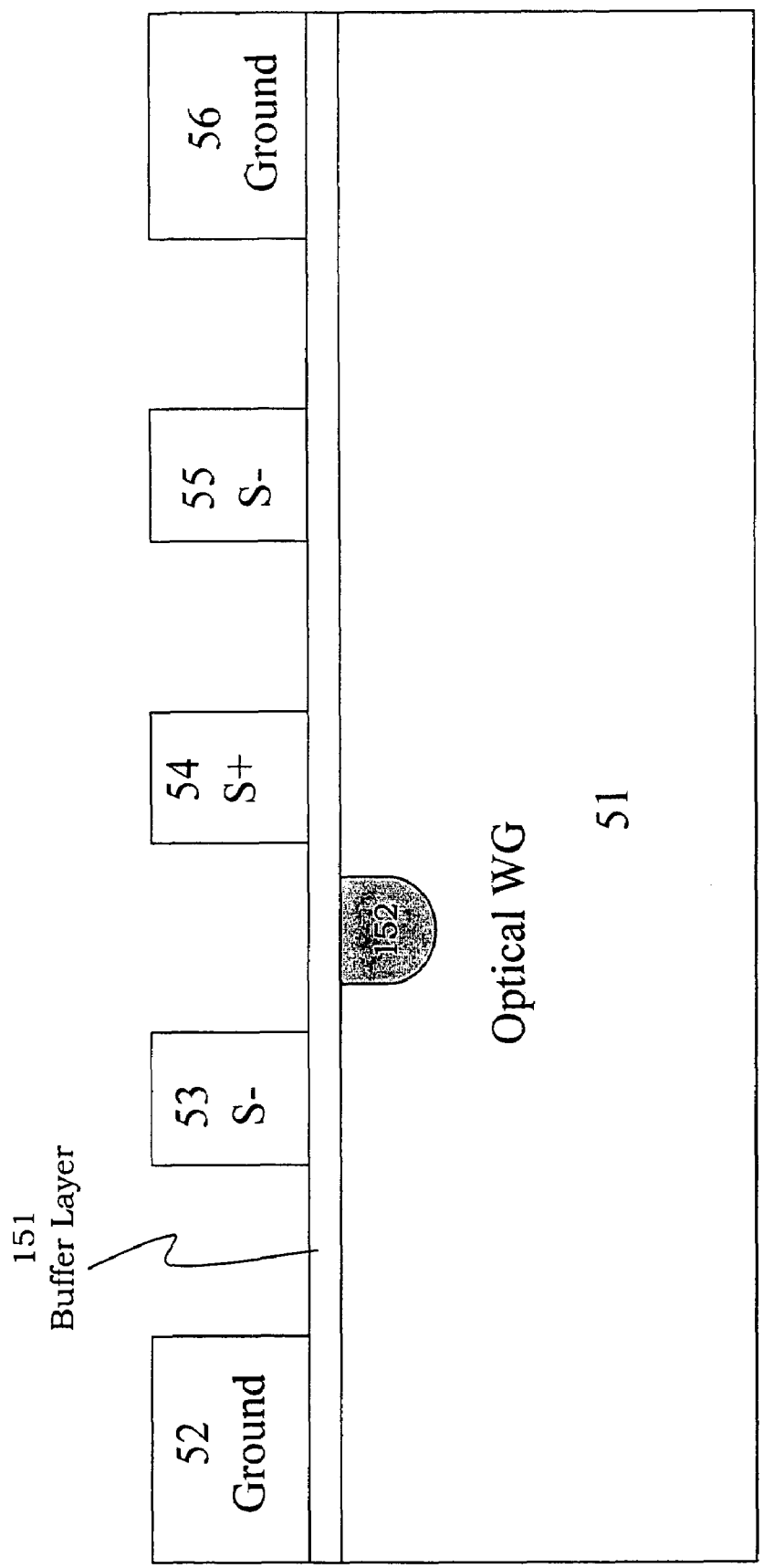
FIG. 15 is a structural diagram illustrating a fourth embodiment of a cross-sectional view of a tri-electrode optical phase shifter with a buffer layer utilizing a horizontal electric field in the optical waveguide in accordance with the present invention.

FIG. 15 is a structural diagram illustrating a fourth embodiment of a cross-sectional view of a tri-electrode optical phase shifter with a buffer layer utilizing a horizontal electric field. A buffer layer 151 is placed between the substrate 51, and the ground electrode 52, the negative S− electrode 53, the positive S+ electrode 54, the negative electrode S− 55, and the ground electrode 56. The width of the buffer layer 151 extends all the way from the ground electrode 52, through the negative S− electrode 53, the positive S+ electrode 54, the negative electrode S− 55, to the ground electrode 56. The buffer layer 141 preferably has a significantly lower dielectric constant than that of the substrate 51. An optical waveguide 152 is positioned in a gap underneath and in between the positive S+ electrode 54 and the negative electrode S− 53.

Figure 16:
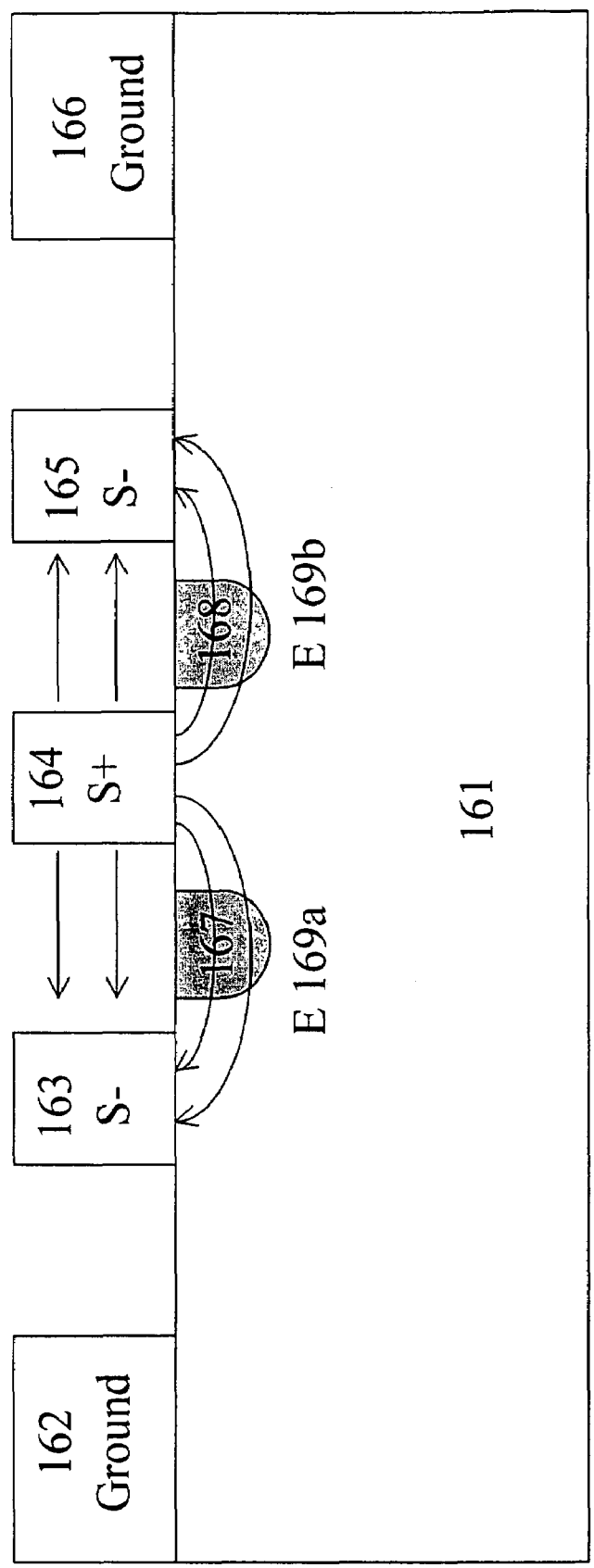
FIG. 16 is a process diagram illustrating a first embodiment of a cross-sectional view of an optical modulator with a tri-electrode utilizing a horizontal electric field in the optical waveguide in accordance with the present invention.

FIG. 16 is a process diagram illustrating a first embodiment of a cross-sectional view of an optical modulator 160 with a tri-electrode utilizing a horizontal electric field in the optical waveguide. The tri-electrode modulator 160 has three electrodes, a negative electrode S− 163, a positive electrode S+ 164, and a negative electrode S− 165. The center electrode, the positive electrode S+, has one polarity, and the outer electrodes, the negative electrode S− 163 and the negative electrode S− 165, have an opposite polarity of the center. One of ordinary skill in the art should recognize that the center electrode could have a negative electrode, while the outer electrodes have positive electrodes. Optical waveguides 167 and 168 are shown in a region of large horizontal field E field 169a and 169b. The optical waveguide (WG) 167 is positioned in a gap underneath and in between the negative electrode S− 163 and the positive electrode S+ 164, thereby being placed in a substantially horizontal field. Similarly, the optical waveguide (WG) 168 is positioned in a gap underneath and in between the positive electrode S+ 164 and the negative electrode S− 165, thereby being placed a substantially horizontal field. An electrical field E 169a exists between the positive electrode S+ 164 and the negative electrode S− 163, and an electrical field E 169b exists between the positive electrode S+ 164 and the negative electrode S− 165.

A first negative signal is introduced into the electrode S− 163 that travels with the positive signal S+ 164 so to significantly enhance the electrical field in the optical waveguide 167. A second negative signal is introduced into the electrode S− 165 that travels with the positive signal S+ 164 so to significantly enhance the electrical field in the optical waveguide 168. The field enhancement is provided by the superposition of the fields created by each electrode giving better performance. The material 161 can be made of any compound having linear electro-optic properties. Lithium Niobate has a preferred x-cut orientation.

Figure 17:
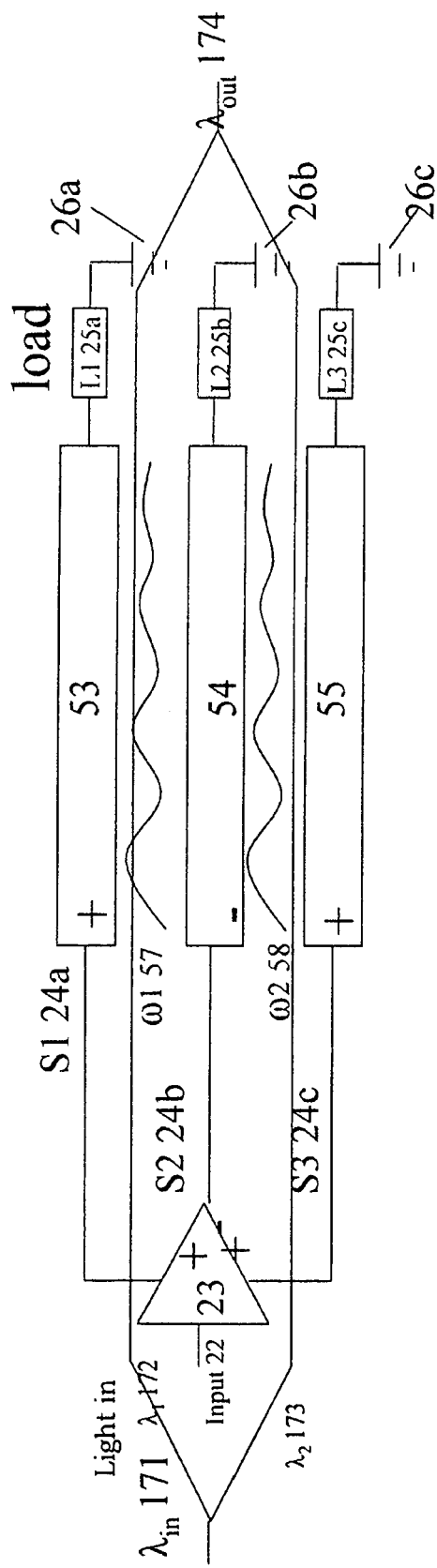
FIG. 17 is a circuit diagram illustrating the first embodiment of an optical modulator with a tri-electrode utilizing a horizontal electric field in the optical waveguide in accordance with the present invention.

FIG. 17 is a circuit diagram illustrating the first embodiment of an optical modulator 170 with a tri-electrode utilizing a horizontal electric field. An amplifier 23 receives an input 22 and generates three electrical outputs through a transmission line S1 24a, a transmission line S2 24b, and a transmission line S3 24c. The transmission line S1 24a extends through the electrode 13 to a load L1 or termination resistor 25a and a ground 26a. The transmission line S2 24b extends through the electrode 54 to a load L2 or termination resistor 25b and a ground 26b. The transmission line S3 24c extends through the electrode 55 to a load L3 or termination resistor 25c and ground 26c. Between the negative electrode 53 and the positive electrode 54, a traveling electrical wave ω1 57 is created due to their proximity. Between the positive electrode 54 and the negative electrode 55, a traveling electrical wave ω2 58 is created due to their proximity. In this embodiment, an optical wave λin 171 is received from, for example, an optical fiber (not shown). The optical signal λin 171 splits into two light signals λ1 172 and λ2 173, before re-combination at the output λout 174. Preferably, the traveling wave ω1 57 is symmetrical or substantially symmetrical to the traveling electrical wave ω2 58.

The amplifier 23 matches the impedance of the transmission lines S1 24a, S2 24b, and S3 24c, and matches the impedance of the loads L1 25a, L2 25b, and L3 25c. In the preferred mode, the amplitudes of the negative electrodes S– 53 and S– 55 have the same amount of amplitude as the amplitude of the positive electrode S+ 54. The amount of signal amplitude applied affects the amount of phase shift. The amount of phase shift is linearly proportional to the signal amplitude generated from the amplifier 23. For example, if applying 1-volt, a 45 degree phase shift can result, and if applying 2-volts, a 90 degree phase shift can result.

A reduction of Vλ×L is caused by the superposition of the field induced by the electrodes, resulting in the enhancement in the electrical field. In one embodiment, the amplitude of the traveling electrical wave ω1 57 is doubled due to the field excitation between the electrodes 53 and 54. However, the increase can be more than 2 times, or less than 2×, depending on the distance between the electrodes 53 and 54, the height of each electrode 53 or 54, and the thickness of a buffer layer. Preferably, the ω1 57 is symmetrical to the traveling electrical wave ω1 58 modulation. One of ordinary skill in the art, however, should recognize that the traveling electrical wave ω1 57 and the traveling electrical wave ω2 58 can be designed to be asymmetrical.

The electrodes of the optical phase-shifter would be driven as in FIG. 17, where a driver amplifier would provide the signal to the three electrodes, the outer two driven with the same polarity and the center with opposite polarity of the outer. The electrical signal propagates from left to right, where the signal is terminated into matched loads.

Optionally, a direct current (DC) bias field can be applied to each of the electrodes S– 53, S+ 54, and S– 55, by direct or indirect coupling.

Figure 18:
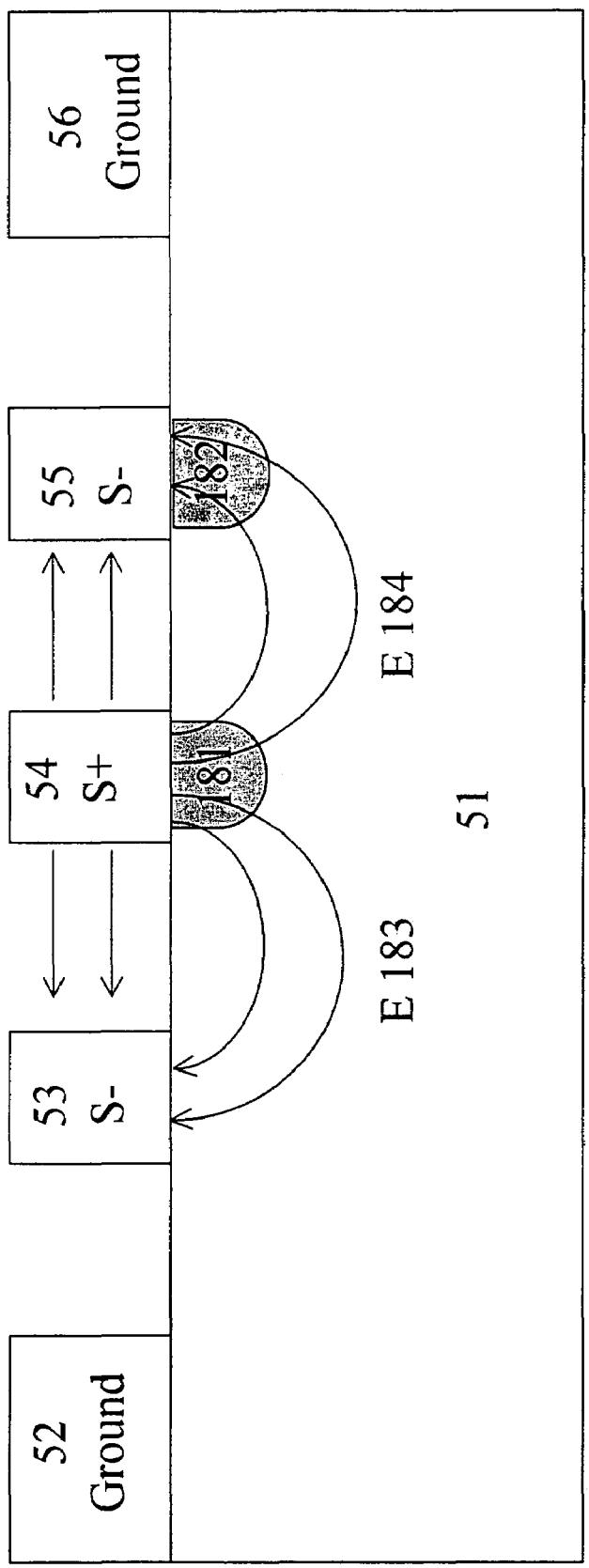
FIG. 18 is a process diagram illustrating a first embodiment of a cross-sectional view of an optical modulator with a tri-electrode utilizing a vertical electric field in the optical waveguide in accordance with the present invention.

FIG. 18 is a process diagram illustrating a first embodiment of a cross-sectional view of an optical modulator 180 with a tri-electrode utilizing a horizontal electric field. Optical waveguides 181 and 182 are shown in a region of large vertical field E field 183 and 184. The optical waveguide (WG) 181 is positioned directly underneath the positive electrode S+ 54. Similarly, the optical waveguide (WG) 182 is positioned directly underneath the negative electrode S– 55, thereby creating a vertical field. An electrical field E 183 exists between the positive electrode S+ 54 and the negative electrode S– 53, and an electrical field E 184 exists between the positive electrode S+ 54 and the negative electrode S– 55.

Figure 19:
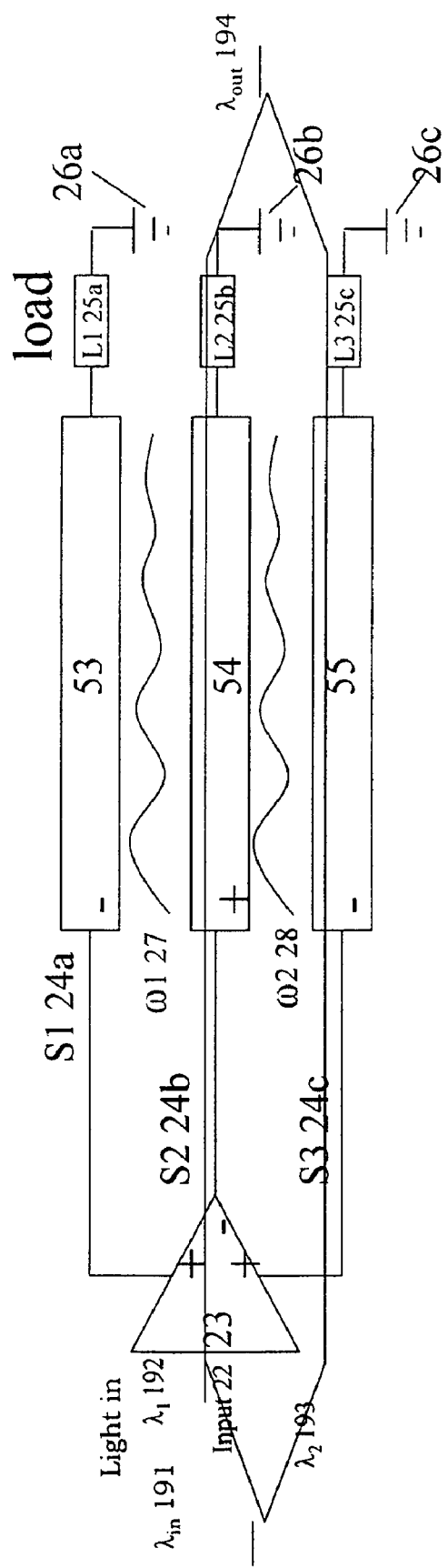
FIG. 19 is a circuit diagram illustrating the second embodiment of an optical modulator with a tri-electrode utilizing a vertical electric field in the optical waveguide in the optical waveguide in accordance with the present invention.

FIG. 19 is a circuit diagram illustrating the second embodiment of an optical modulator 190 with a tri-electrode utilizing a horizontal electric field. In this embodiment, the optical signal λin 191 splits into two light signals $\lambda_1$ 192 and $\lambda_2$ 193, before re-combination at the output $\lambda_{out}$ 194. The $\lambda_1$ 192 travels underneath the positive electrode 54 and the $\lambda_2$ 193 travels underneath the negative electrode 55. Preferably, the traveling wave ω1 27 is symmetrical or substantially symmetrical to the traveling electrical wave ω2 28.

Figure 20:
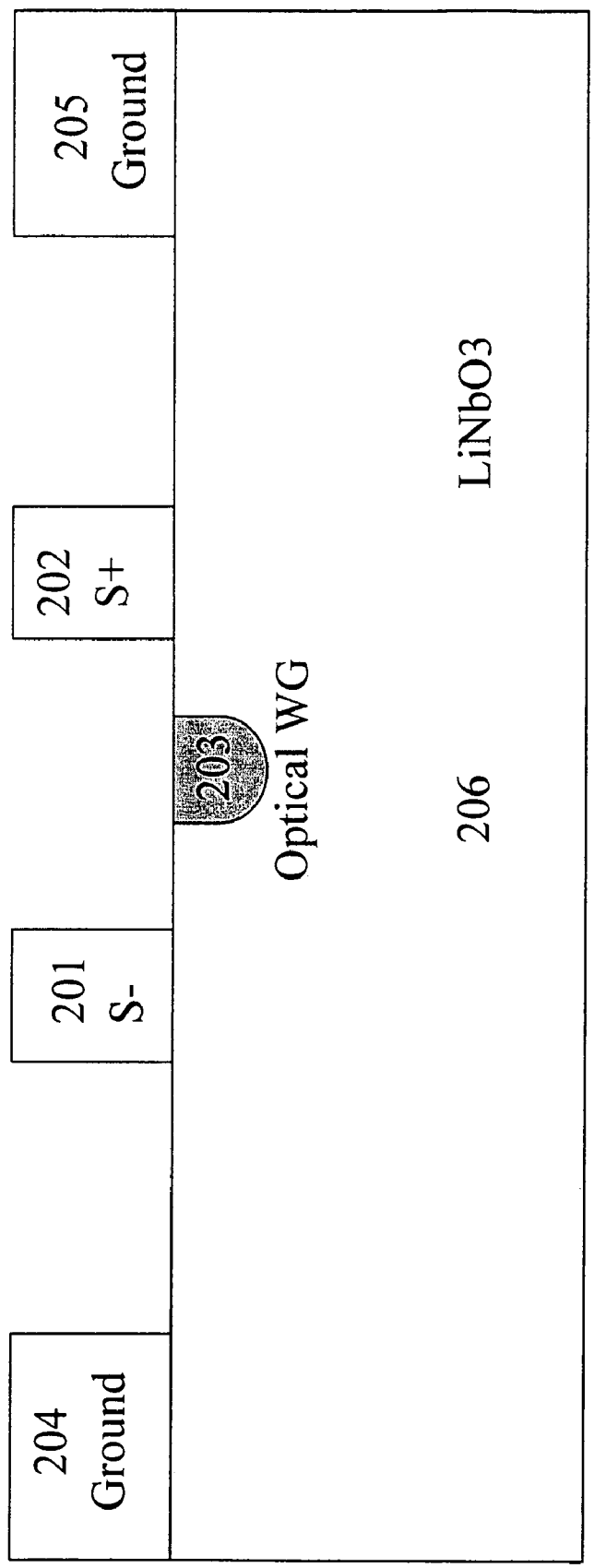
FIG. 20 is a process diagram illustrating a phase shifter employing dual-electrode with a horizontal electric field in the optical waveguide in accordance with the present invention.

FIG. 20 is a process diagram illustrating a phase shifter 200 employing dual-electrodes with a horizontal electric field in the optical waveguide. The phase shifter 200 has two electrodes, a first electrode 201 and a second electrode 202, where the first electrode 201 has an opposite polarity as the second electrode 202. An optical waveguide 203 is placed in a gap underneath and in between the first electrode 201 and the second electrode 202, in generating a horizontal electric field. Ground electrodes 204 and 205 are used to suppress the couplings to parasitic modes at high frequencies. A substrate 206 can be selected from a material such as like GaAs, KDP, or LiNbO3, which demonstrates a linear electro-optic effect.

A negative signal is introduced into the electrode S– 201 that travels with the positive signal S+ 202 to enhance an electrical field significantly. The field enhancement is provided by the superposition of the fields created by each electrode giving better performance. The material 206 can be made of any compound having linear electro-optic properties.

Figure 21:
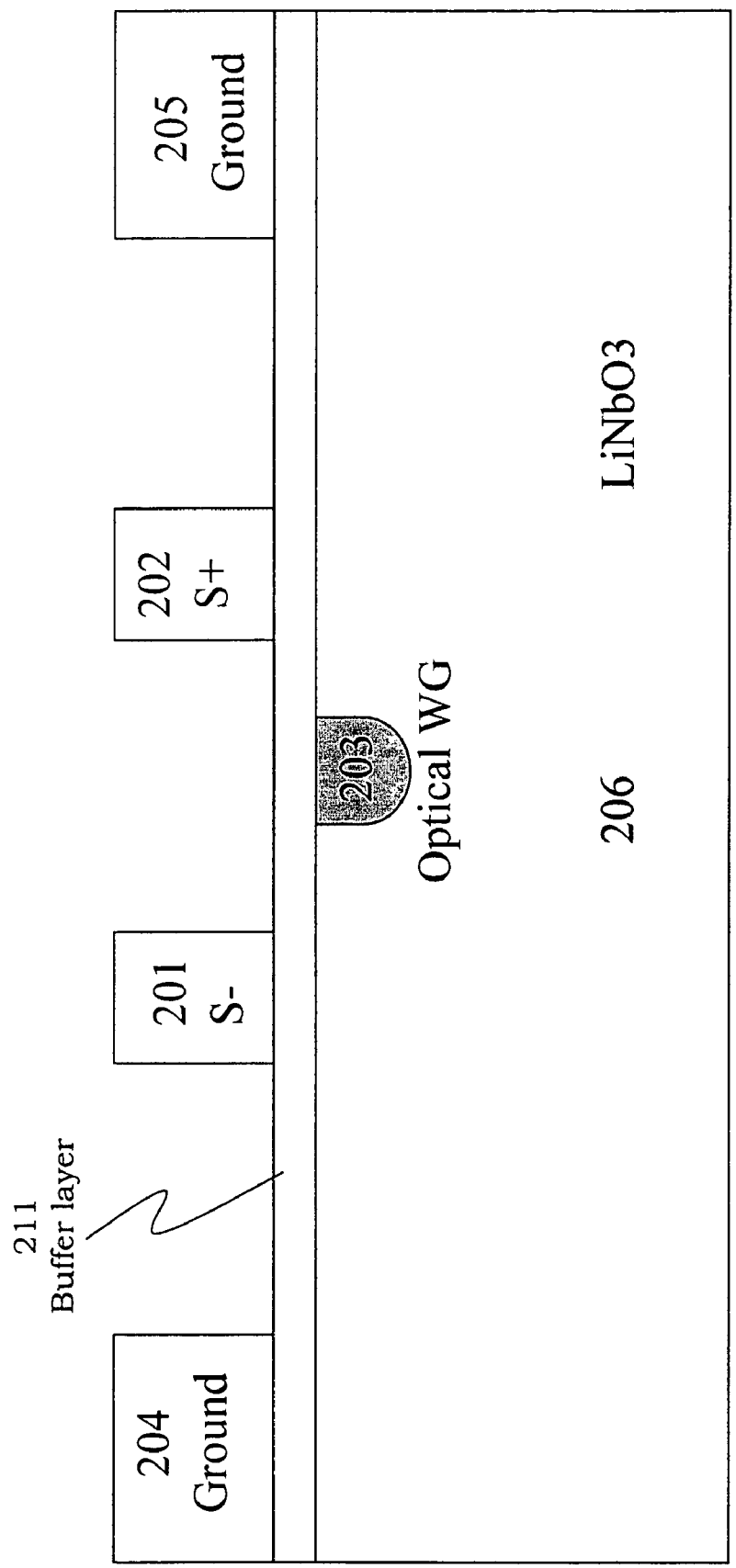
FIG. 21 is a process diagram illustrating a phase shifter employing dual-electrode with a horizontal electric field in the optical waveguide with a buffer layer in accordance with the present invention.
Figure 22:
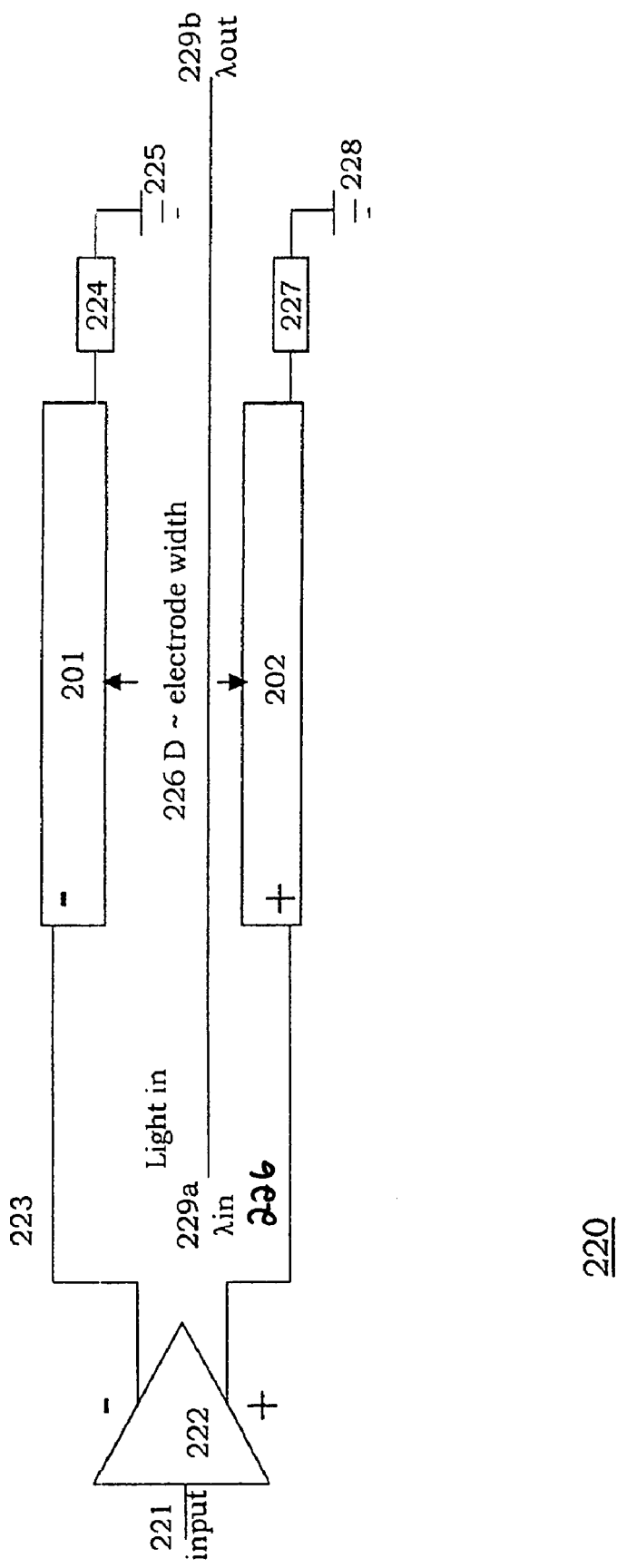
FIG. 22 is a circuit diagram illustrating a phase-shifter employing dual-electrode with a horizontal electric field in the optical waveguide in accordance with the present invention.

FIG. 21 is a process diagram illustrating a phase shifter 210 employing dual-electrodes with a horizontal electric field in the optical waveguide with a buffer layer. A buffer layer 211 is placed between the substrate 206, and the ground electrode 204, the negative S– electrode 201, the positive S+ electrode 202 and the ground electrode 205. The width of the buffer layer 211 extends all the way from the ground electrode 204, through the negative S– electrode 201, the positive S+ electrode 202, to the ground electrode 205. The buffer layer 211 preferably has a significantly lower dielectric constant than that of the substrate 206. The use of the buffer layer 211 helps to improve the phase matching between an electrical signal and an optical signal, as well as increasing the electrode impedance.

If the substrate 206 uses lithium niobate, the preferred material for the buffer layer 211 is silicon oxide, with a thickness of, for example, 1 microns. With the buffer layer 211, the design of a phase shifter is significantly simpler due to the more electric field in the air. Optionally, the thickness of the buffer layer 211 can be reduced to enhance the electrical field.

Figure 23:
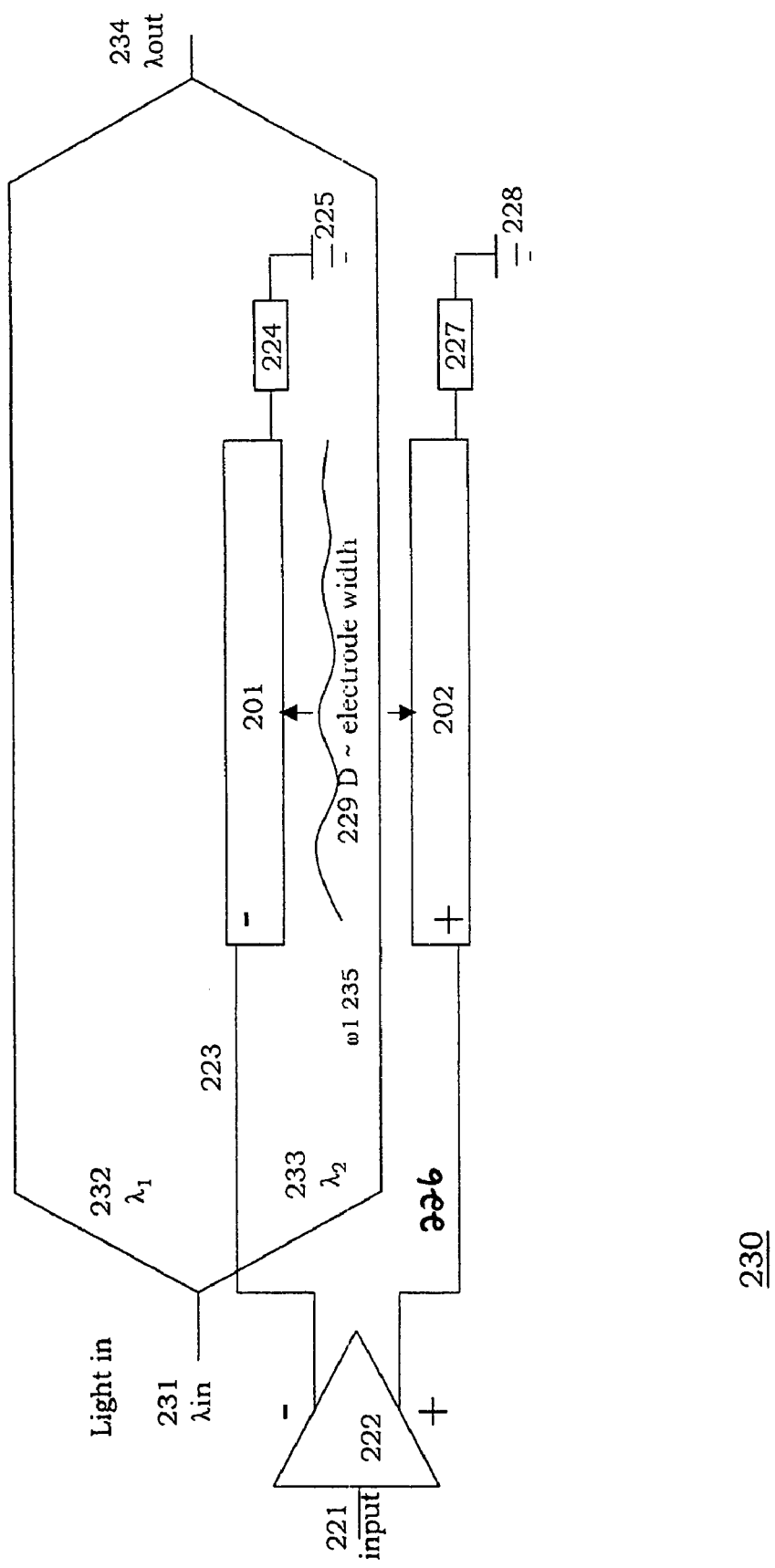
FIG. 23 is a circuit diagram illustrating a single arm modulator employing dual-electrodes with a horizontal electric field in the optical waveguide in accordance with the present invention.

FIG. 23 is a circuit diagram illustrating a single arm modulator 230 employing dual-electrodes with a horizontal electric field in the optical waveguide. The single end or single arm modulator 230 receives a light sign input λin 231 and splits the light signal λin 231 into two optical paths, a λ1 232 and a λ2 233. The λ1 232 travels in an optical waveguide that is routed away from the negative electrode S– 201 and the positive electrode S+ 202, while the λ2 233 travels between the negative electrode S– 201 and the positive electrode S+ 202. λ1 232 and a λ2 233 are combined to generate a single optical output λout 234. The amplifier 222 receives the electrical input 221, generates the first output to a transmission line 223 to the negative electrode 201, a loading or termination resistor 224, and the ground 225, and generates a second output to a transmission line 226 to the positive electrode 202, a loading or termination resistor 227, and the ground 228. Between the negative electrode 201 and the positive electrode 202, a traveling electrical wave ω1 235 is created due to their proximity. In this embodiment with dual-electrode traveling wave optical phase-shifter, the distance D electrode width 229 between the negative electrode 201 and the positive electrode 202 is relatively short in distance, preferably less than or equal to 20 microns.

Figure 24:
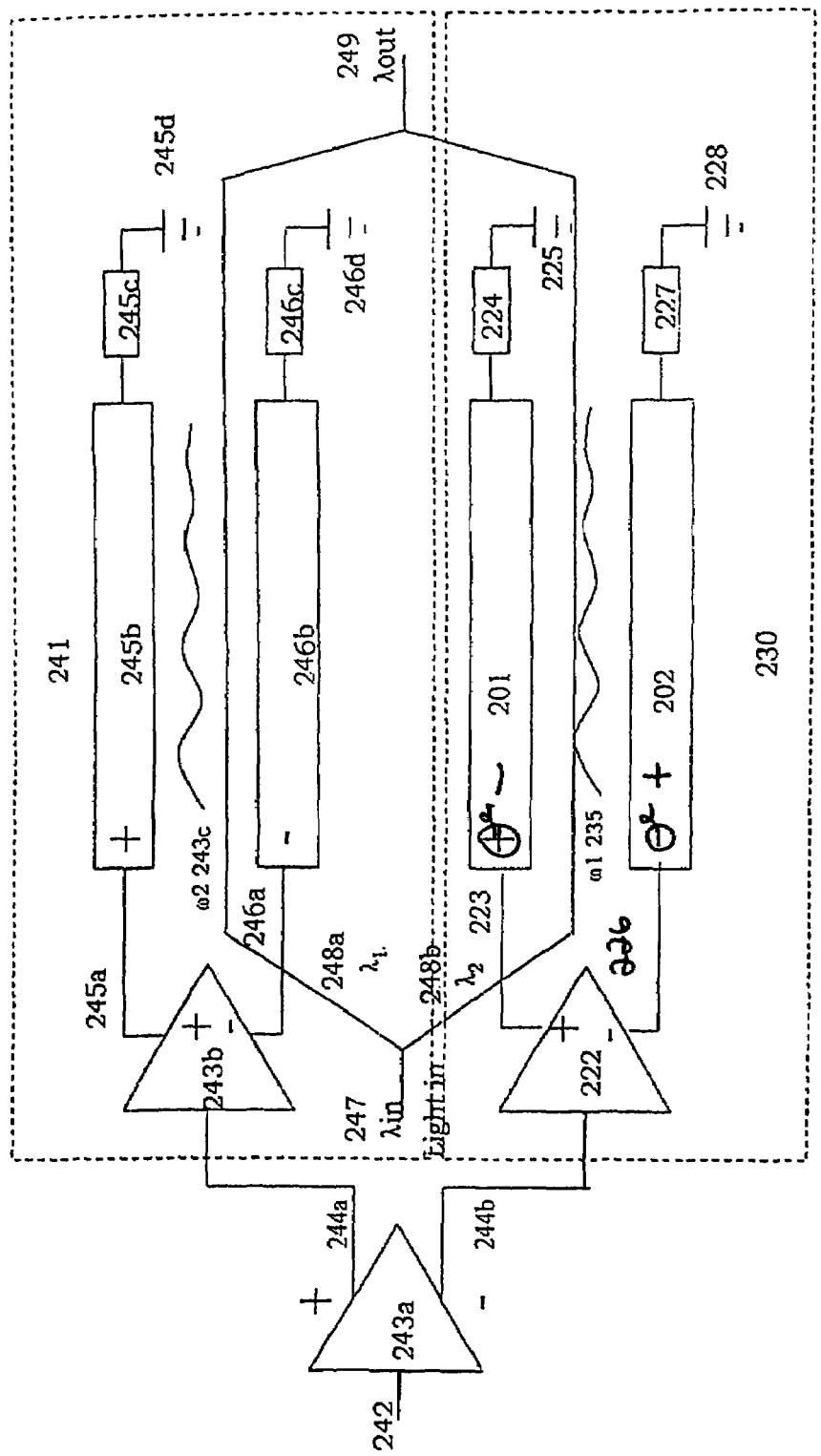
FIG. 24 is a circuit diagram illustrating two phase shifters connected in parallel to form a MZ modulator utilizing a horizontal electric field in the optical waveguide in accordance with the present invention.

FIG. 24 is a circuit diagram illustrating two phase-shifters 240 connected in parallel to form a MZ modulator utilizing a horizontal electric field in the optical waveguides, having an upper phase-shifter 241 and the lower optical phase-shifter 230. The light signal input λin 247 is split into two paths, the λ1 248a and the λ2 248b, which are re-combined to generate a λout 249. An amplifier 243a receives the input 242 and generates a first output 244a to an amplifier 243a, and a second output 244b to the amplifier 222. The amplifier 243b then generates two electrical outputs through a transmission line S1 245a, and a transmission line S2 246a. The transmission line S1 245a extends through a first electrode 245b to the load L1 or termination resistor 245c and the ground 245d. The transmission line S2 246a extends through the electrode 246b to the load L2 or termination resistor 246c and the ground 246d. Between the negative electrode 201 and the positive electrode 202, a traveling electrical wave ω1 235 is created due to their proximity.

Figure 25:
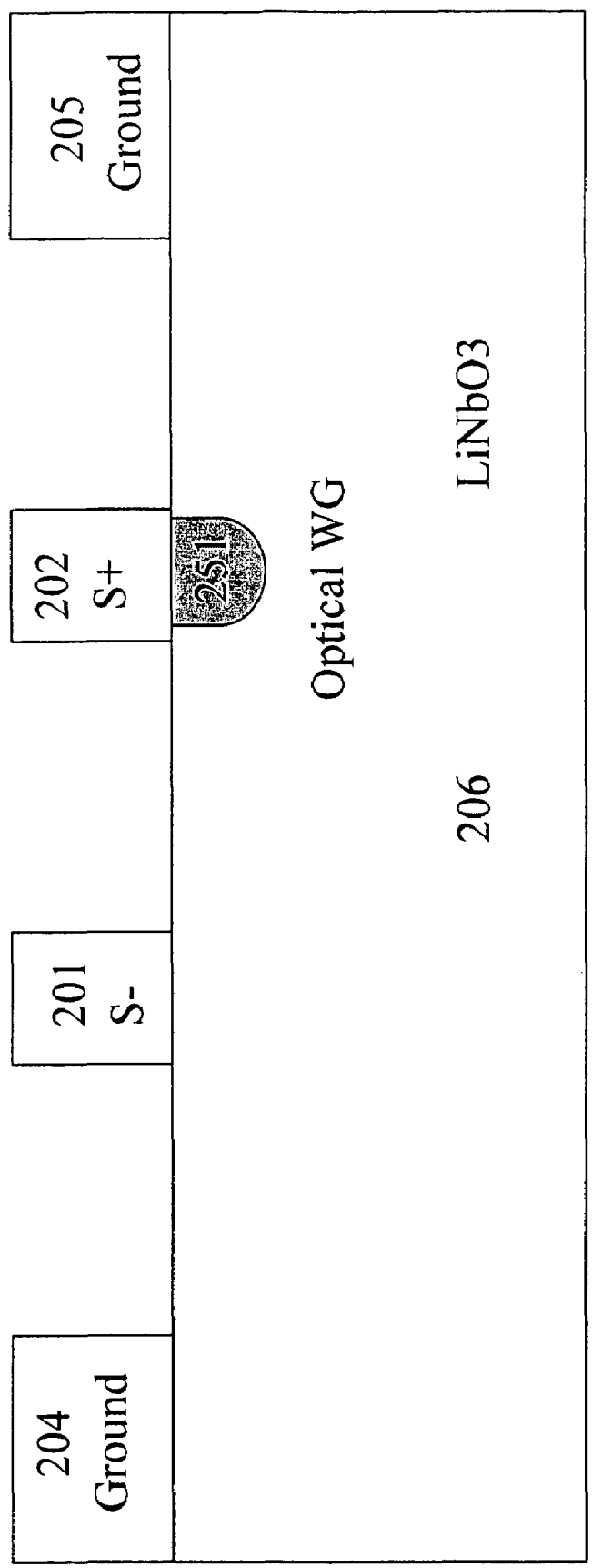
FIG. 25 is a process diagram illustrating a phase shifter employing dual-electrode with a vertical electric field in the optical waveguide in accordance with the present invention.

Preferably for wide band applications, the electrical wave ω1 235 matches or substantially matches the electrical wave ω2 243c. In addition, the light wave $\lambda_1$ 248a matches or substantially matches the light wave $\lambda_2$ 248b. Optionally, the electrodes 245b, 246b, 201, and 202 can be connected to a voltage supply (not shown), to generate a DC bias field in the optical waveguides. FIG. 25 is a process diagram illustrating a phase shifter 250 employing dual-electrodes with a vertical electric field. The phase shifter 250 has two electrodes, a first electrode 201 and a second electrode 202, where the first electrode 201 has an opposite polarity as the second electrode 202. An optical waveguide 251 is placed directly underneath the second electrode 202, thereby being placed in a substantially vertical electric field. Ground electrodes 204 and 205 are used to suppress the couplings to parasitic modes at high frequencies. A substrate 206 can be selected from a material such as like GaAs, KDP, or LiNbO3, which demonstrates a linear electro-optic effect.

A negative signal is introduced into the electrode S− 201 that travels with the positive signal S+ 202 to enhance an electrical field significantly. The field enhancement is provided by the superposition of the fields created by each electrode giving better performance. The material 206 can be made of any compound having linear electro-optic properties.

Figure 26:
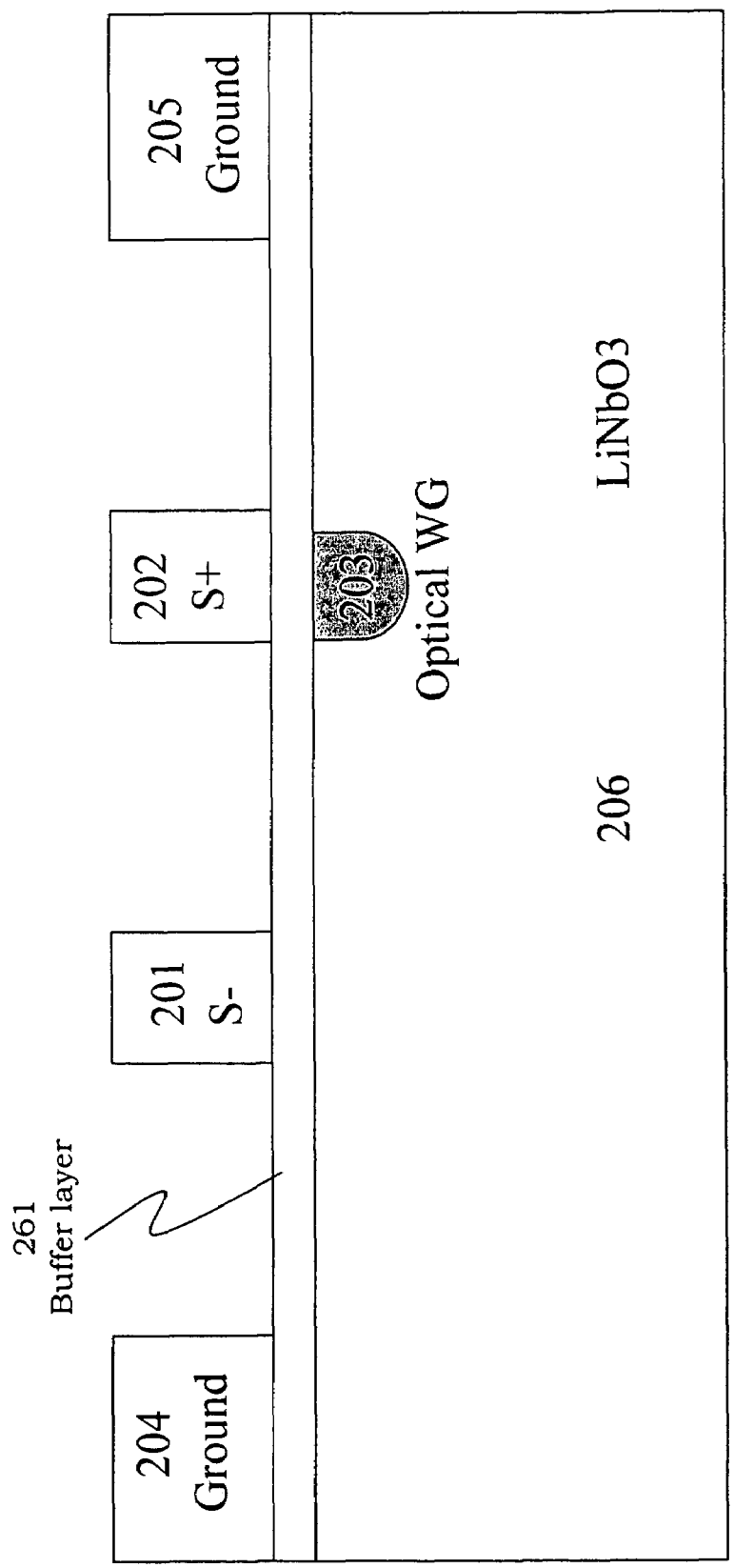
FIG. 26 is a circuit diagram illustrating a phase shifter employing dual-electrode with a vertical electric field in the optical waveguide with a buffer layer in accordance with the present invention.

FIG. 26 is a circuit diagram illustrating a phase shifter 260 employing dual-electrodes with a vertical electric field with a buffer layer. A buffer layer 261 is placed between the substrate 206, and the ground electrode 204, the negative S− electrode 201, the positive S+ electrode 202 and the ground electrode 205. The width of the buffer layer 261 extends all the way from the ground electrode 204, through the negative S-electrode 201, the positive S+ electrode 202, to the ground electrode 205. The buffer layer 261 preferably has a significantly lower dielectric constant than that of the substrate 206. The use of the buffer layer 261 helps to improve the phase matching between an electrical signal and an optical signal, as well as increasing the electrode impedance.

If the substrate 206 uses lithium niobate, the preferred material for the buffer layer 261 is silicon oxide, with a thickness of, for example, 1 microns. With the buffer layer 261, the design of a phase shifter is significantly simpler due to the more electric field in the air. Optionally, the thickness of the buffer layer 261 can be reduced to enhance the electrical field.

Figure 27:
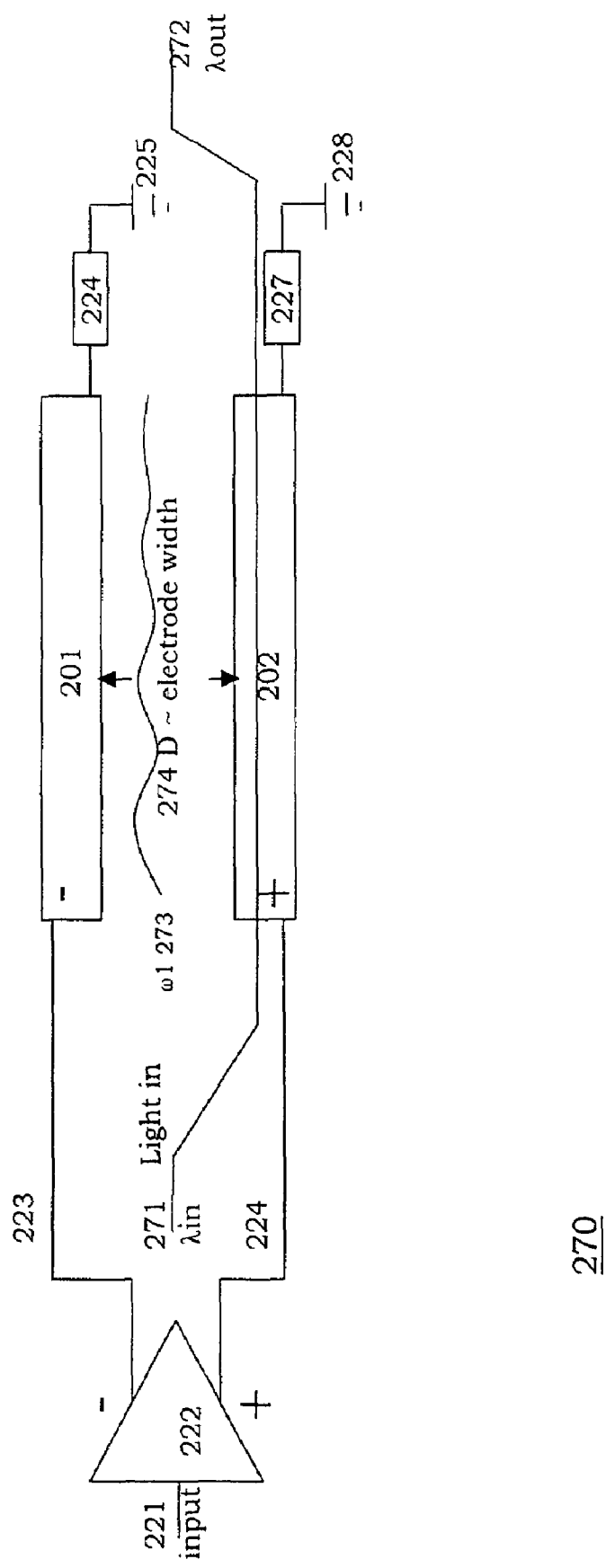
FIG. 27 is a process diagram illustrating a phase shifter employing dual-electrode with a vertical electric field in the optical waveguide in accordance with the present invention.

FIG. 27 is a circuit diagram illustrating a phase shifter 270 employing dual-electrodes with a vertical electric field in the optical waveguide. The amplifier 222 receives the electrical input 221, generates a first output to a transmission line 223 to the negative electrode 201, a loading or termination resistor 224, and a ground 225, and generates a second output to a transmission line 226 to the positive electrode 202, a loading or termination resistor 227, and a ground 228. An input light signal λin 271 travels underneath the positive electrode 202 in generating an output light signal 272. Between the negative electrode 201 and the positive electrode 202, a traveling electrical wave ω1 273 is created due to their proximity. In this embodiment with dual-electrode traveling wave optical phase-shifter, a distance D electrode width 274 between the negative electrode 201 and the positive electrode 202 is relatively short in distance, preferably less than or equal to 20 microns.

Figure 28:
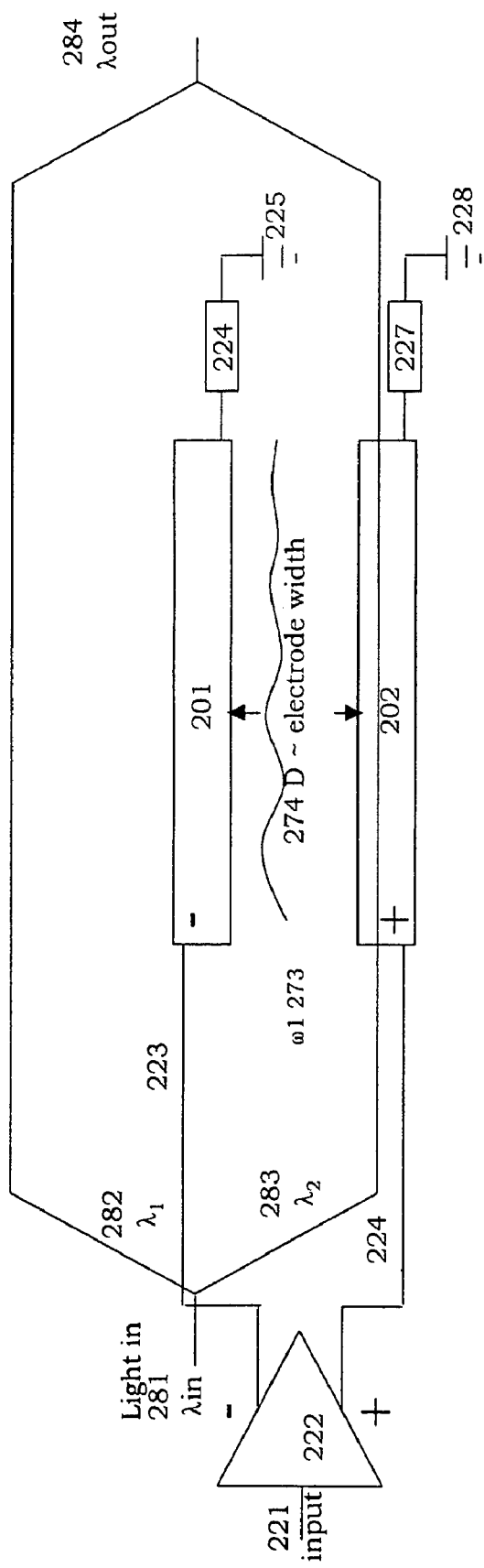
FIG. 28 is a circuit diagram illustrating a single arm modulator employing dual-electrode with a vertical electric field in the optical waveguide in accordance with the present invention.

FIG. 28 is a circuit diagram illustrating a single arm modulator 280 employing dual-electrodes with a vertical electric field in the optical waveguide. The single arm modulator 280 receives a light signal input λin 181 and splits the light signal λin 281 into two optical paths, a λ1 282 and a λ2 283. The λ1 282 travels in an optical waveguide that is routed away from the negative electrode S− 201 and the positive electrode S+ 202, while the λ2 283 travels underneath the positive electrode S+ 202. λ1 282 and λ2 283 are combined to generate a single optical output λout 284. The amplifier 222 receives the electrical input 221, generates the first output to a transmission line 223 to the negative electrode 201, a loading or termination resistor 224, and the ground 225, and generates a second output to a transmission line 226 to the positive electrode 202, a loading or termination resistor 227, and the ground 228. Between the negative electrode 201 and the positive electrode 202, a traveling electrical wave λ1 273 is created due to their proximity. In this embodiment with dual-electrode traveling wave optical phase-shifter, the distance D electrode width 274 between the negative electrode 201 and the positive electrode 202 is relatively short in distance, preferably less than or equal to 20 microns.

Figure 29:
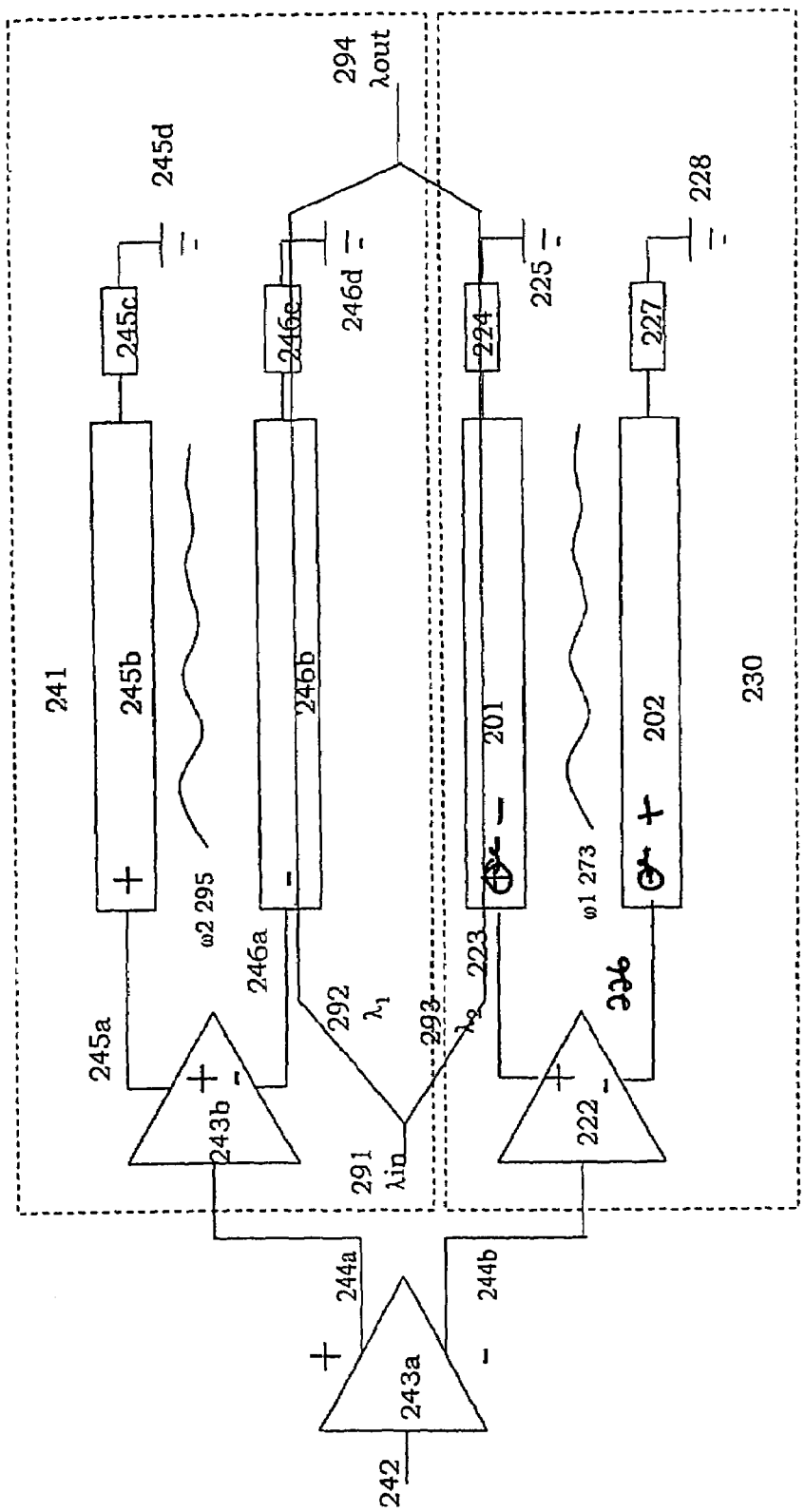
FIG. 29 is a circuit diagram illustrating two phase-shifters connected in parallel to form a MZ modulator utilizing a vertical electric field in the optical waveguide in accordance with the present invention.

FIG. 29 is a circuit diagram illustrating two phase-shifters 290 connected in parallel to form a MZ modulator utilizing a vertical electric field, having an upper phase-shifter 241 and the lower optical phase-shifter 230. The light signal input λin 291 is split into two paths, the λ1 292 and the λ2 293, which are re-combined to generate a λout 294. The λ1 292 light signal travels underneath a positive electrode 245b, while the λ2 293 light signal travels underneath the negative electrode 201. The amplifier 243a receives the input 242 and generates a first output 244a to an amplifier 243a, and a second output 244b to the amplifier 222. The amplifier 243b then generates two electrical outputs through a transmission line S1 245a, and a transmission line S2 246a. The transmission line S1 245a extends through a first electrode 245b to the load L1 or termination resistor 245c and the ground 245d. The transmission line S2 246a extends through the electrode 246b to the load L2 or termination resistor 246c and the ground 246d. Between the negative electrode 201 and the positive electrode 202, a traveling electrical wave ω1 273 is created due to the close proximity of a gap between them. Between the negative electrode 246b and the positive electrode 245b, a traveling electrical wave ω2 295 is created due to their proximity.

Preferably, the light wave $\lambda_1$ 292 matches or substantially matches the light wave $\lambda_2$ 293. Optionally, the electrodes 245b, 246b, 201, and 202 can be connected to a voltage supply (not shown), to generate a DC bias field in the optical waveguides.

Figure 30:
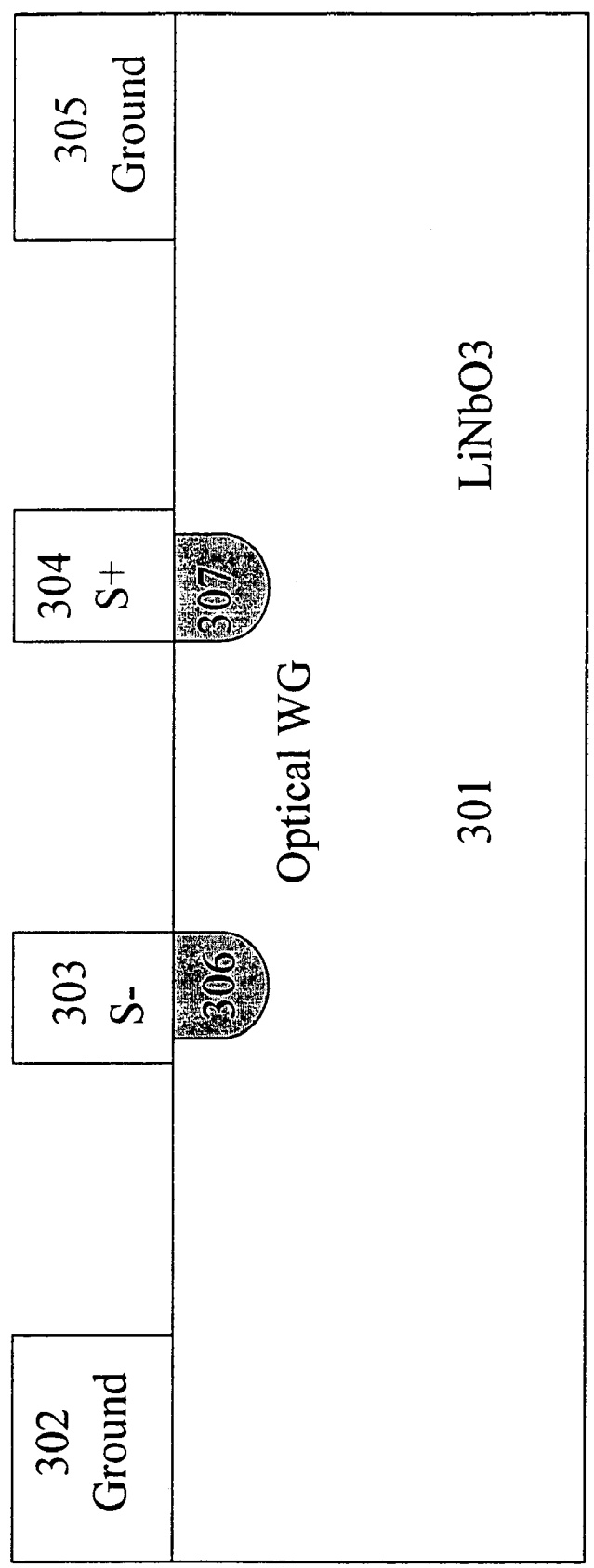
FIG. 30 is a structural diagram illustrating a dual-electrode modulator where two optical waveguides are placed in regions of utilizing a vertical electric field in the optical waveguide in accordance with the present invention.

FIG. 30 is a structural diagram illustrating a dual-electrode modulator 300 where two optical waveguides 306 and 307 are placed in regions of a vertical electric field. The dual-electrode modulator 300 has two electrodes, a negative electrode S− 303, and a positive electrode S+ 304. The two electrodes, the negative electrode S– 303 and the positive electrode S+ 304, have opposite polarity from one another. It is apparent to one of ordinary skill in the art that the polarity of the two electrodes can be swapped. The optical waveguide (WG) 306 directly is underneath the negative electrode S– 303, thereby experiencing a substantially vertical electric field. Similarly, the optical waveguide (WG) 307 is directly underneath the positive electrode S+ 304, thereby experiencing a substantially vertical electric field.

A first negative signal is introduced into the electrode S– 303 that travels with the positive signal S+ 304 for significant enhancement of the electrical field in the optical waveguides. The field enhancement is provided by the superposition of the fields created by each electrode giving better performance. Ground electrodes 302 and 305 are used to suppress the couplings to parasitic modes at high frequencies. A substrate 301 can be selected from a material such as like GaAs, KDP, or LiNbO3, which demonstrates a linear electro-optic effect.

Figure 31:
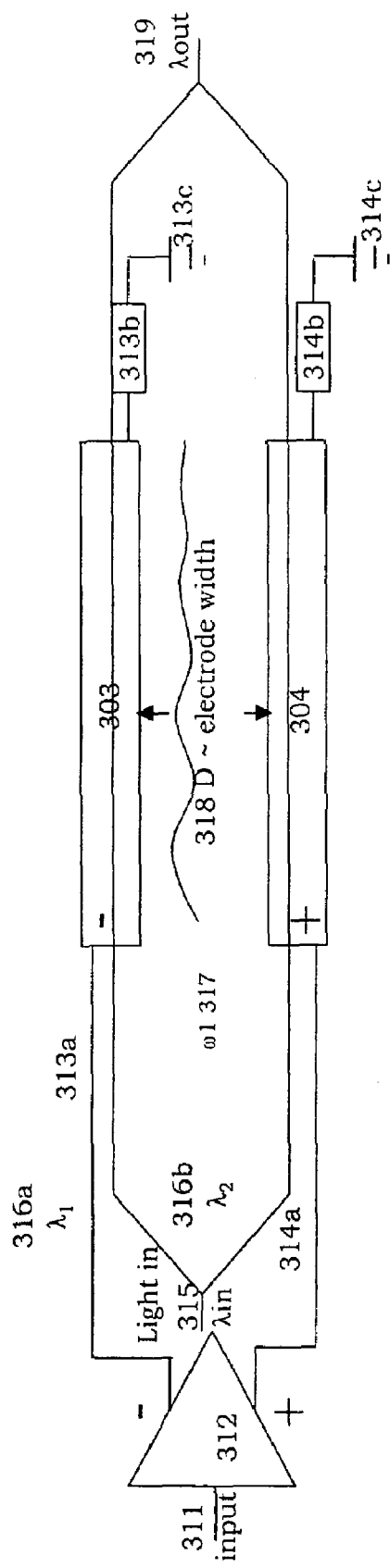
FIG. 31 is a circuit diagram illustrating a dual-electrode modulator driven from an electrical amplifier with two optical waveguides utilizing a vertical electric field in the optical waveguide in accordance with the present invention.

FIG. 31 is a circuit diagram illustrating a dual-electrode modulator 310 driven from an amplifier with two optical waveguides utilizing a vertical electric field. An amplifier 312 receives an electrical signal input 311 and generates a first output to a transmission line S1 313a and a second output to a transmission line S2 314b. The transmission line S1 313a extends through the negative electrode 303, to a load or termination resistor 313b and a ground 313c. The transmission line S1 314a extends through the positive electrode 304, to a load or termination resistor 314b and a ground 314c.

The dual-electrode modulator 310 receives a light signal input $\lambda_{in}$ 315 and split the light signal $\lambda_{in}$ 315 into two optical paths, a $\lambda_1$ 316a and a $\lambda_2$ 316b. The $\lambda_1$ 316a travels underneath the negative electrode S– 303, while the $\lambda_2$ 316b travels underneath the positive electrode S+ 304, for generating a single optical output $\lambda_{out}$ 319. Between the negative electrode 303 and the positive electrode 304, a traveling electrical wave ω1 317 is created due to the close proximity of a gap between them. In this embodiment with dipole-enhanced traveling wave optical phase-shifter, the distance D electrode width 318 is relatively short in distance between the negative electrode 303 and the positive electrode 304, preferably less than or equal to 20 microns.

Figure 32:
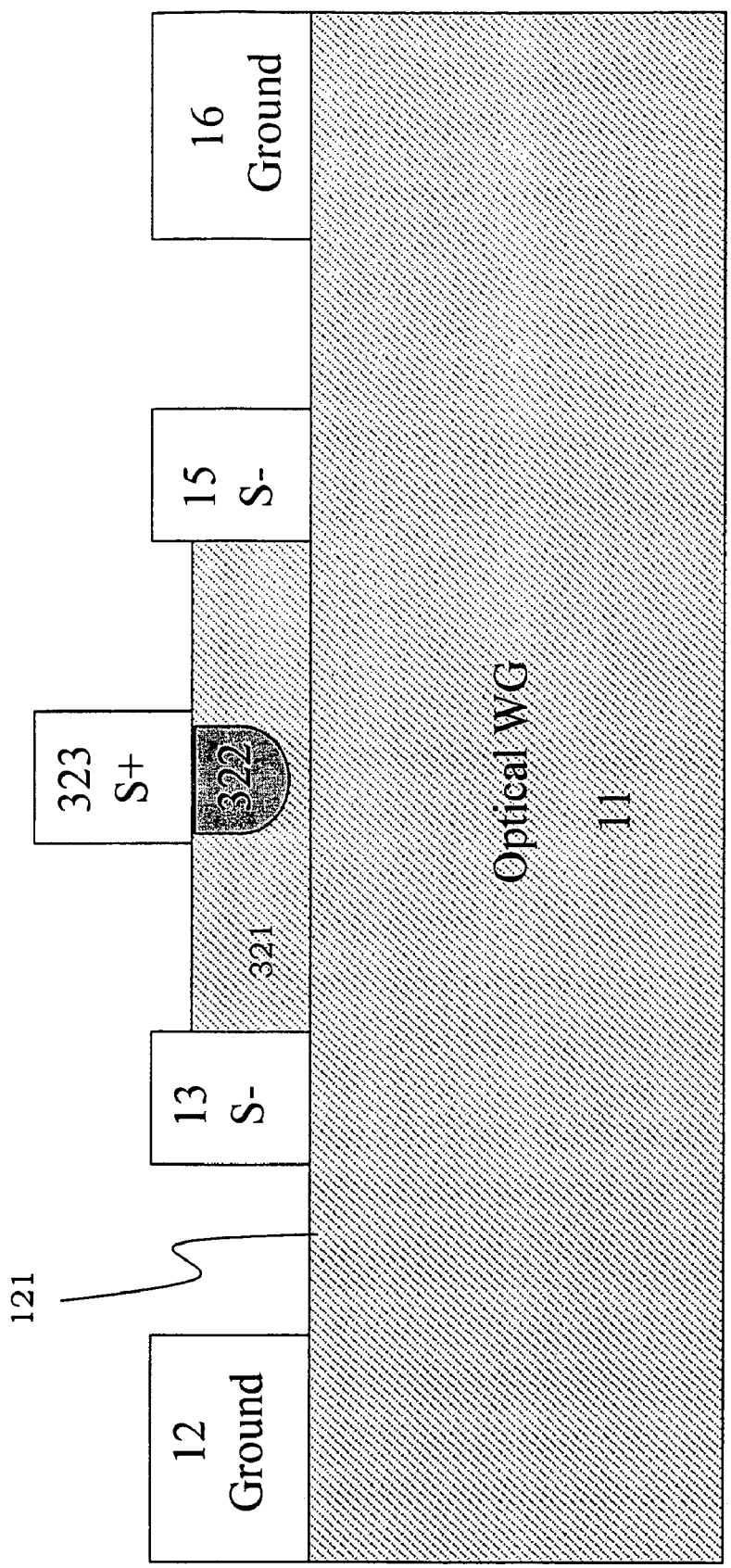
FIG. 32 is a process diagram illustrating a ridge structure employing tri-electrodes utilizing a vertical electric field in the optical waveguide in accordance with the present invention.

FIG. 32 is a process diagram illustrating a ridge structure 320 employing tri-electrodes utilizing a vertical electric field. A ridge layer 321 is added above the element 11, with an optical wave guide 322 internal to the ridge layer 321 and underneath a positive electrode 323. The ridge is layer typically built of the same materials as the element 11, which has a linear electro-optic coefficient.

Figure 33:
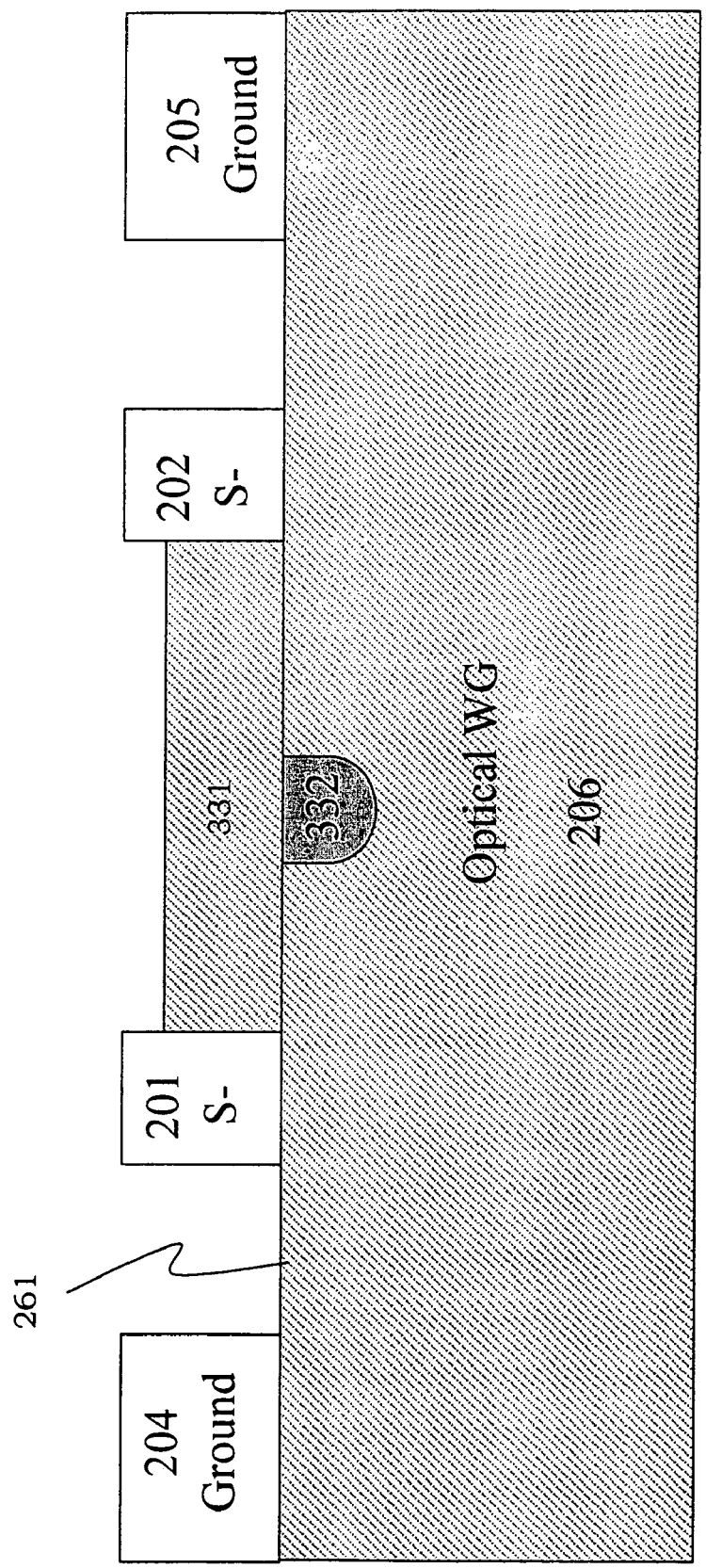
FIG. 33 is a process diagram illustrating a ridge structure employing dual-electrode with a horizontal electric field in the optical waveguide in accordance with the present invention.

FIG. 33 is a process diagram illustrating ridge structure 330 employing double-electrodes with a horizontal electric field. A ridge layer 331 is added above the layer 206, with an optical wave guide 332 underneath the buffer layer 261, as well as in gaps underneath and in between the negative electrode 201, and the positive electrode 202. The ridge layer is typically built of the same materials as the element 11, which has a linear electro-optic coefficient.

Figure 34:
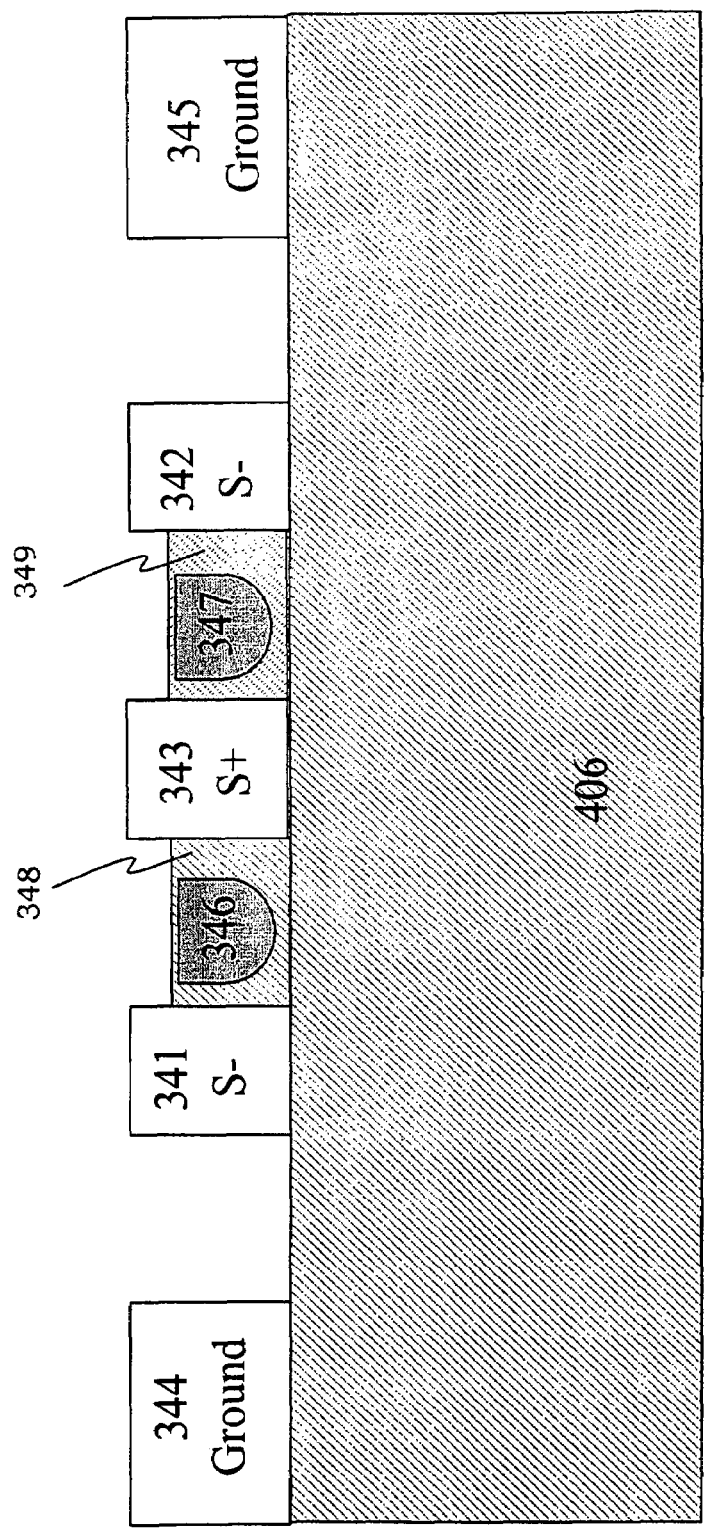
FIG. 34 is a process diagram illustrating a modulator employing a ridge structure with dual-electrode with a horizontal electric field in the optical waveguides in accordance with the present invention.

FIG. 34 is a structural diagram illustrating a dual-electrode modulator 340 where two optical waveguides 346 and 347 are placed in regions of a horizontal electric field. The dual-electrode modulator 340 has three electrodes, a negative electrode S– 341, and a positive electrode S+ 343 and a negative electrode S– 342. The three electrodes, the negative electrode S– 341 and S– 342, and the positive electrode S+ 343, have opposite polarity from one another. It is apparent to one of ordinary skill in the art that the polarity of the three electrodes can be swapped. The optical waveguide (WG) 346 is placed directly in the ridge 348 between the negative electrode S– 341 and the positive electrode S+ 343 in a substantially horizontal electric field. Similarly, the optical waveguide (WG) 347 is placed directly in the ridge 349 between the negative electrode S– 342 and the positive electrode S+ 343, thereby experiencing a substantially horizontal electric field.

A first negative signal is introduced into the electrode S– 341, and a second negative signal is introduced into the electrode S– 342, that travels with the positive signal S+ 343 for significant enhancement of the electrical field in the optical waveguides. The field enhancement is provided by the superposition of the fields created by each electrode giving better performance. Ground electrodes 344 and 345 are used to suppress the couplings to parasitic modes at high frequencies. A substrate 406 can be selected from a material such as like GaAs, KDP, or LiNbO3, which demonstrates a linear electro-optic effect. The ridge 348 and ridge 349 typically are built of the same material as substrate 406.

In all the preceding diagrams, FIGS. 1–34, the electrodes have been labeled either positive or negative in order to indicate that they are driven with opposite polarity modulation signals. Another suitable notation is to use S and $\overline{S}$, where the symbol S has an opposite polarity from $\overline{S}$. In one embodiment, the polarity referred to is that of the modulation component of the signal applied to the electrode, and is not meant to refer to the absolute polarity of field between the electrodes. For example, applying a large DC offset to one of the electrodes could make the absolute polarity of electric field between the electrodes constant, but the polarity of the modulation components of the signals applied to S+ and S– would still be of opposite polarity.

It should be clear to one of ordinary skill in the art that the actual drive waveform applied to the positive electrode may be either positive or negative at a given point in time, and the actual drive waveform applied to the negative electrode will be of opposite polarity. For example, FIG. 35A is a diagram illustrating one example of a pair of time-varying signals with opposite modulation polarity. At time slice $t_1$, the signal applied to the positive electrode S+ has a higher voltage than the signal applied to the negative electrode S–. At time slice $t_2$, the signal applied to the positive electrode S+ has a lower voltage than the signal applied to the negative electrode S–.

FIG. 35B is a graphical diagram illustrating electric field lines between the positive electrode S+ and negative electrode S– at time $t_1$. The electric field between the electrodes flows from S+ to S–. FIG. 35C is a graphical diagram illustrating electric field lines between the positive electrode S+ and negative electrode S– at time $t_2$. The electric field between the electrodes flows from S– to S+.

If a large DC offset voltage were added to the modulation signal applied to S+, then at time slice $t_1$, the signal applied to the positive electrode S+ would have a higher voltage than the signal applied to the negative electrode S–, and at time slice $t_2$, the signal applied to the positive electrode S+ would be reduced by the modulation component of the signal, but would still have a higher absolute voltage than the signal applied to the negative electrode S–. In this case, with a large DC voltage applied to S+, the electric field lines would flow from S+ to S– as shown in FIG. 35B, but the necessary condition of applying opposite polarity modulation signals to S+ and S– would still be satisfied.

The above embodiments are only illustrative of the principles of this invention and are not intended to limit the invention to the particular embodiments described. For example, although the tri-electrodes have been specified as the negative electrode S− 13, the positive electrode S+ 14, and the negative electrode S− 15, one of ordinary skill in the art should know that the polarities can be altered, such as having a positive electrode S+ 13, a negative electrode S− 14, and a positive electrode S+ 15. The concept is to have the electrode 13 and electrode 15 having one polarity, and the electrode 14 having an opposite polarity from the electrodes 13 and 15. Alternatively, the electrode 13 and the electrode 14 can have the same polarity but with a different amplitude where the difference in amplitude is equal or substantially similar to the amplitude difference between a positive electrode and a negative electrode. Accordingly, various modifications, adaptations, and combinations of various features of the described embodiments can be practiced without departing from the scope of the invention as set forth in the appended claims.

We claim:

1. A device comprising a plurality of electrodes, comprising:
   a first optical phase shifter comprising:
   a first electrode having a first polarity;
   a second electrode, spaced apart from the first electrode, having a second polarity that is opposite of the first polarity;
   a first ground electrode, coupled to the first electrode of the first optical phase shifter, and a second ground electrode coupled to the second electrode of the first optical phase shifter, and
   a light input signal comprising a first optical signal and a second optical signal, wherein the device functions as a single arm modulator.

2. The device of claim 1, further comprising:
   a second optical phase shifter, coupled to the first optical phase shifter, comprising:
   a first electrode having a first polarity; and
   a second electrode, spaced apart from the first electrode, having
   a second polarity that is opposite of the first polarity.

3. The device of claim 1, further comprising an optical waveguide placed underneath and in between the first electrode of the first optical phase shifter and the second electrode of the first optical phase shifter, thereby creating a horizontal electric field.

4. The device of claim 1, further comprising a light input signal traveling between the first electrode of the first optical phase shifter and the second electrode of the first optical phase shifter.

5. The device of claim 1, wherein the first optical signal is traveling between the first electrode of the first optical phase shifter and the second electrode of the first optical phase shifter.

6. The device of claim 1, wherein the second optical signal is traveling above the first electrode of the first optical phase shifter.

7. The device of claim 1, further comprising a buffer layer extending from the first electrode and the second electrode.

8. The device of claim 1, further comprising an optical waveguide placed adjacent to and in between the first and second electrodes.

9. The device of claim 1, wherein the first polarity comprises a positive polarity, and the second polarity comprises a negative polarity.

10. The device of claim 1, wherein the first polarity comprises a negative polarity, and the second polarity comprises a positive polarity.

11. The device of claim 1, comprising an optical waveguide disposed substantially underneath the first electrode of the first optical phase shifter.

12. The device of claim 1, comprising a ridge structure disposed between the first electrode and the second electrode of the first optical phase shifter.

* * * * *